(12) United States Patent
Doi et al.

(10) Patent No.: US 8,293,562 B2
(45) Date of Patent: Oct. 23, 2012

(54) DYE-SENSITIZED SOLAR CELL MANUFACTURING METHOD

(75) Inventors: Katsuhiro Doi, Chiba (JP); Kenichi Okada, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 13/116,629

(22) Filed: May 26, 2011

(65) Prior Publication Data

US 2011/0223704 A1 Sep. 15, 2011

Related U.S. Application Data

(63) Continuation of application No. PCT/JP2010/057395, filed on Apr. 29, 2010.

(30) Foreign Application Priority Data

Jul. 28, 2009 (JP) ................................. 2009-175938

(51) Int. Cl.
*H01L 21/00* (2006.01)
*H01L 31/18* (2006.01)
(52) U.S. Cl. .................................. 438/64; 257/E31.117
(58) Field of Classification Search .................... 438/64, 438/69, 72, 82, 127; 257/E31.117
See application file for complete search history.

(56) References Cited

U.S. PATENT DOCUMENTS

2011/0056559 A1* 3/2011 Sahlin et al. .................. 136/259
2011/0126879 A1* 6/2011 Kitamura et al. ............. 136/244

FOREIGN PATENT DOCUMENTS

| JP | 2004-319112 A | 11/2004 |
| JP | 2007-220608 A | 8/2007 |
| JP | 2008-115057 A | 5/2008 |
| WO | WO 2009144949 A1 * | 12/2009 |

* cited by examiner

*Primary Examiner* — William D Coleman
*Assistant Examiner* — Christine Enad
(74) *Attorney, Agent, or Firm* — Sughrue Mion, PLLC

(57) ABSTRACT

A dye-sensitized solar cell manufacturing method of the invention comprises the steps of: preparing a first electrode having an oxide semiconductor layer and a second electrode; forming a first sealing portion by melting and bonding a thermoplastic resin at a first annular section of the first electrode; forming a second sealing portion by melting and bonding a thermoplastic resin at a second annular section of the second electrode; loading a photosensitive dye on the oxide semiconductor layer; forming an electrolyte layer by arranging an electrolyte on the first electrode within the first sealing portion; and forming a sealing portion through bonding the first and second sealing portions, wherein the electrolyte layer is formed after forming the first sealing portion; the sealing portion is formed after loading the dye and forming the electrolyte layer; and the sealing portion is formed through melting the first and second sealing portions, applying pressure.

9 Claims, 14 Drawing Sheets

F I G. 6
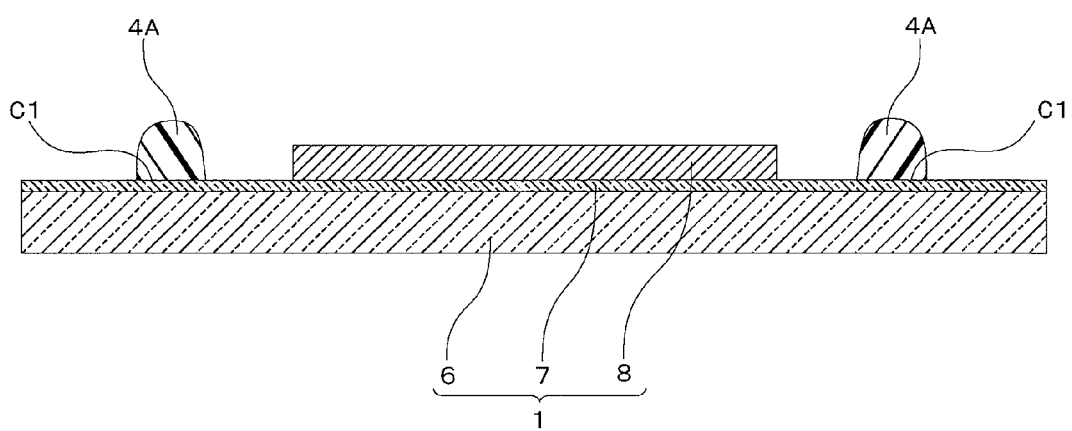

DYE-SENSITIZED SOLAR CELL MANUFACTURING METHOD

CROSS REFERENCE TO RELATED APPLICATIONS

This application is a Continuation of National Stage of International Application No. PCT/JP2010/057395 filed Apr. 26, 2010, claiming priority based on Japanese Patent Application No. 2009-175938 filed Jul. 28, 2009, the contents of all of which are incorporated herein by reference in their entirety.

TECHNICAL FIELD

The present invention relates to a dye-sensitized solar cell manufacturing method.

BACKGROUND ART

Dye-sensitized solar cells have attracted attention, as photoelectric conversion elements, since they are inexpensive and afford high photoelectric conversion efficiency. Various developments relating to dye-sensitized solar cells are underway.

Dye-sensitized solar cells comprise ordinarily a working electrode, a counter electrode, a photosensitive dye supported on the working electrode, a sealing portion that connects the working electrode and the counter electrode, and an electrolyte layer disposed in a space (hereafter, "cell space") that is enclosed by the working electrode, the counter electrode and the sealing portion.

As a method for manufacturing such a dye-sensitized solar cell there has been proposed a method for manufacturing a dye-sensitized solar cell having excellent power generation efficiency, wherein the method involves forming a sealing member comprising a thermoplastic resin in only the working electrode or the counter electrode; infusing an electrolyte within of the sealing member, under reduced pressure, to form an electrolyte layer; and bonding next the working electrode and the counter electrode under reduced pressure, through heating and pressing, to prevent thereby air from becoming trapped between the working electrode and the counter electrode (Patent document 1 below).

PRIOR ART DOCUMENT

Patent Document

Patent document 1: Japanese Patent Application Publication No. 2007-220608

SUMMARY OF THE INVENTION

Problems to be Solved by the Invention

In dye-sensitized solar cells, it is ordinarily important to suppress drops in photoelectric conversion efficiency over time due to electrolyte leakage.

However, the above-described dye-sensitized solar cell manufacturing method set forth in Patent document 1 had the following problems.

The electrolyte comprises obviously not a little volatile component in a case where the electrolyte is an ionic liquid electrolyte and a gel electrolyte, as well as in a case where the electrolyte is a volatile electrolyte. Upon bonding of the working electrode and the counter electrode after infusion of the electrolyte within the sealing member, however, part of the volatile component in the electrolyte evaporates as the sealing member is heated. This evaporation decreases the wettability of the bonding surface between the sealing member and the working electrode or the counter electrode. Strong bonding strength fails as a result to be achieved between the sealing member and the working electrode or the counter electrode. This may result in electrolyte leakage in the obtained dye-sensitized solar cell. Further, bonding may be hampered by adhered matter resulting from electrolyte that adheres to the bonding surface between the sealing member and the working electrode or the counter electrode, during placement of the electrolyte. This may give rise to significant electrolyte leakage in the obtained dye-sensitized solar cell.

When the dye-sensitized solar cell obtained in accordance with the manufacturing method set forth in Patent document 1 was placed at a section subjected to large temperature changes, stresses derived from expansion or shrinking of the cell space concentrated at the interface between the working electrode and the sealing portion, and at the interface between the counter electrode and the sealing portion, as a result of which the bonding strength between the sealing portion and the counter electrode or the working electrode may weaken in a comparatively short time. This could result in electrolyte leakage in a comparatively short time.

Therefore, the dye-sensitized solar cell obtained in accordance with the manufacturing method of Patent document 1 left room for improvement in terms of suppressing drops of photoelectric conversion efficiency over time due to electrolyte leakage.

In the light of the above, it is an object of the present invention to provide a dye-sensitized solar cell manufacturing method that allows manufacturing a dye-sensitized solar cell in which drops of photoelectric conversion efficiency over time can be sufficiently suppressed.

Means for Solving the Problems

As a result of diligent research directed at solving the above problems, the inventors perfected the present invention upon finding that the problems can be solved by forming beforehand a sealing portion, comprising a thermoplastic resin, on each of two electrodes that are to be bonded, before formation of an electrolyte layer; forming then an electrolyte layer, and causing thereafter the sealing portions formed on each electrode to be bonded to each other.

Specifically, the invention is a dye-sensitized solar cell manufacturing method that has: a preparation step of preparing a first electrode having a porous oxide semiconductor layer, and a second electrode; a first sealing portion formation step of forming a first sealing portion by melting and bonding a thermoplastic resin at a first annular section, of the first electrode, that surrounds the porous oxide semiconductor layer; a second sealing portion formation step of forming a second sealing portion by melting and bonding a thermoplastic resin at a second annular section of the second electrode; a dye support step of causing a photosensitive dye to be supported on the porous oxide semiconductor layer; an electrolyte layer formation step of forming an electrolyte layer by arranging an electrolyte on the first electrode, within the first sealing portion, or on the second electrode, within the second sealing portion; and a sealing portion formation step of forming a sealing portion through bonding of the first sealing portion and the second sealing portion, wherein the electrolyte layer formation step is carried out after at least one of the first sealing portion formation step and the second sealing portion formation step; the sealing portion formation step is carried out after the dye support step and the electrolyte layer formation step; and in the sealing portion formation step, the sealing portion is formed through melting, while under application of pressure, of the first sealing portion and the second sealing portion.

According to the above manufacturing method, at least one from among the first sealing portion formation step and the second sealing portion formation step is carried out before the electrolyte layer formation step. As a result, the volatile component in the electrolyte does not adhere to the first annular section, and the wettability of the surface thereof is not impaired, upon formation of the first sealing portion at the first annular section, in the first electrode, that surrounds the porous oxide semiconductor layer. Therefore, the thermoplastic resin becomes strongly bonded to the first annular section, and the first sealing portion solidly fixed to the first annular section. Alternatively, the volatile component in the electrolyte does not adhere to the second annular section, and the wettability of the surface thereof is not impaired, upon formation of the second sealing portion at the second annular section. Therefore, the thermoplastic resin becomes strongly bonded to the second annular section, and the second sealing portion solidly fixed to the second annular section.

On the other hand, the sealing portion formation step is carried out after the electrolyte layer formation step. Therefore, part of the electrolyte layer evaporates and wettability between the first sealing portion and the second sealing portion decreases accompanying the melting of the first sealing portion and the second sealing portion. In some instances, the electrolyte becomes adhered to the first sealing portion and the second sealing portion during the electrolyte layer formation step, and wettability between the first sealing portion and the second sealing portion decreases.

At this time, however, the first sealing portion and the second sealing portion are each made up of a thermoplastic resin, and hence the thermoplastic resins are bonded to each other when the first sealing portion and the second sealing portion are bonded. As a result, the first sealing portion and the second sealing portion bond to each other more readily than in a case where a thermoplastic resin is bonded to the first electrode or the second electrode. The first sealing portion and the second sealing portion are bonded while under application of pressure to both. Therefore, even if electrolyte adheres to the first sealing portion and the second sealing portion, the adhered electrolyte is removed by being driven out, and the molten thermoplastic resin of the first sealing portion and the molten thermoplastic resin of the second sealing portion dissolve into each other, on account of the flow of the thermoplastic resins in the first sealing portion and the second sealing portion, whereby the first sealing portion and the second sealing portion become strongly bonded. In some cases, the electrolyte may become partially trapped within the sealing resin, depending on the viscosity of the adhered electrolyte and on the compatibility thereof with the sealing resin. The trapping ratio, however, is lowered through pressing of the sealing portions, so that bonding between the first sealing portion and the second sealing portion is kept strong.

In the manufacturing method of the dye-sensitized solar cell according to the present invention, thus, even if the cell space shrinks or expands when the obtained dye-sensitized solar cell is exposed to an environment of large temperature differences, the stress generated thereby is dispersed over the interface between the first sealing portion and the first electrode, the interface between the second sealing portion and the second electrode, and the interface between the first sealing portion and the second sealing portion. Also, the first sealing portion is solidly fixed to the first annular section of the first electrode, and the second sealing portion is solidly fixed to the second annular section of the second electrode. Further, the first sealing portion and the second sealing portion are strongly bonded to each other. Therefore, leakage of the volatile component in the electrolyte can be sufficiently suppressed in the obtained dye-sensitized solar cell even if the cell space shrinks or expands when the obtained dye-sensitized solar cell is exposed to an environment of large temperature differences. Intrusion of external moisture into the electrolyte is sufficiently suppressed as well. The dye-sensitized solar cell manufacturing method of the present invention, therefore, allows manufacturing a dye-sensitized solar cell in which drop of photoelectric conversion efficiency over time can be sufficiently suppressed.

In the above manufacturing method, preferably, the sealing portion formation step is carried out in a reduced-pressure space. In this case, the electrolyte layer can be brought to a negative pressure state, with respect to external air, when the obtained dye-sensitized solar cell is taken out from the reduced pressure into the atmosphere. The dye-sensitized solar cell is acted upon, as a result, by atmospheric pressure from outside, and there is maintained the state whereby the first electrode and the second electrode apply compressive force onto the sealing portion. Leakage of the volatile component in the electrolyte can be suppressed yet more fully as a result.

In the above manufacturing method, preferably, at least one of the first electrode and the second electrode has flexibility.

In this case, the electrode having flexibility from among the first electrode and the second electrode can flex on account of atmospheric pressure, whereby the spacing between the first electrode and the second electrode can be narrowed, when the dye-sensitized solar cell is taken out of the reduced-pressure space and exposed to atmospheric pressure, as compared with a case where neither the first electrode nor the second electrode has flexibility. As a result, photoelectric conversion takes place more efficiently, and photoelectric conversion efficiency is enhanced, as compared with a case where neither the first electrode nor the second electrode has flexibility.

In the electrolyte layer formation step, the electrolyte layer can be formed by infusing the electrolyte onto the first electrode, within the first sealing portion, or onto the second electrode, within the second sealing portion, and causing the electrolyte to overflow beyond the first sealing portion or the second sealing portion to the outside of the first sealing portion or the second sealing portion.

In this case, the electrolyte can be sufficiently injected within the first sealing portion or the second sealing portion. Also, air can be sufficiently removed from the space surrounded by the first electrode, the second electrode and the sealing portion upon formation of the sealing portion through bonding of the first sealing portion and the second sealing portion. Drops of photoelectric conversion efficiency over time can be sufficiently suppressed thereby.

In the electrolyte layer formation step, the electrolyte layer can be formed by applying the electrolyte in such a manner that the electrolyte does not spill beyond the first sealing portion or the second sealing portion, by calculating beforehand the amount of electrolyte to be applied within the first sealing portion or the second sealing portion. Theoretically, no electrolyte is wasted in this case, since the electrolyte does not overflow beyond the first sealing portion or the second sealing portion. In this case as well, the first sealing portion comprising a thermoplastic resin is disposed beforehand on the first electrode, and the second sealing portion comprising a thermoplastic resin is disposed beforehand on the second electrode. Therefore, strong bonding between the first sealing portion and the second sealing portion is strongly preserved even if part of the electrolyte layer evaporates and becomes adhered to the first sealing portion and the second sealing portion.

More preferably, the electrolyte is applied after calculating beforehand the amount of electrolyte necessary for enabling air to be sufficiently removed from the space that is surrounded by the first electrode, the second electrode and the sealing portion, during application of the electrolyte.

In the electrolyte layer formation step, preferably, the electrolyte layer is formed on the first electrode, within the first sealing portion.

In this case, the sealing step is carried out after the electrolyte has thoroughly spread into the fine pores of the porous oxide semiconductor layer. Formation of air bubbles in the porous oxide semiconductor layer can be sufficiently suppressed thereby, and also drops of photoelectric conversion efficiency over time can be sufficiently suppressed.

In the above manufacturing method, preferably, the first electrode has: the porous oxide semiconductor layer; a conductive film on which the porous oxide semiconductor layer is formed; and a protrusion that is provided so as to protrude on the conductive film and that constitutes the first annular section, and the protrusion is formed of an inorganic material.

In this case, the protrusion comprising an inorganic material is provided so as to protrude on the conductive film, and hence the protrusion has the function of sealing the electrolyte layer together with the sealing portion. Further, since the protrusion comprises an inorganic material, the protrusion has a higher sealing ability than the first sealing portion and the second sealing portion, which comprise thermoplastic resins. As a result, electrolyte leakage can be more thoroughly suppressed as compared with a case in which the first electrode does not have the protrusion.

In the above manufacturing method, preferably, the second electrode has: a counter electrode substrate; a catalyst layer provided on the counter electrode substrate; and a protrusion that is provided so as to protrude on the catalyst layer and that constitutes the second annular section, and the protrusion is formed of an inorganic material.

In this case, the protrusion comprising an inorganic material is provided so as to protrude on the catalyst layer, and hence the protrusion has the function of sealing the electrolyte layer together with the sealing portion. Since the protrusion comprises an inorganic material, moreover, the protrusion has a higher sealing ability than the first sealing portion and the second sealing portion, which comprise thermoplastic resins. As a result, electrolyte leakage can be more thoroughly suppressed as compared with a case in which the second electrode does not have the protrusion.

The present invention is also a dye-sensitized solar cell that comprises a first electrode having a porous oxide semiconductor layer; a second electrode disposed so as to oppose the first electrode; a sealing portion that connects the first electrode and the second electrode; and an electrolyte layer that fills a cell space surrounded by the first electrode, the second electrode and the sealing portion; wherein the sealing portion has a first sealing portion provided on the side of the first electrode, and a second sealing portion, provided on the side of the second electrode, and bonded to the first sealing portion; and wherein the first sealing portion and the second sealing portion are bonded via a mixed layer that comprises a mixture of the resin included in the first sealing portion, an oxide of the resin, the resin included in the second sealing portion, and an oxide of the resin.

According to this dye-sensitized solar cell, even if the cell space shrinks or expands when the obtained dye-sensitized solar cell is exposed to an environment of large temperature differences, the stress generated thereby is dispersed over the interface between the first sealing portion and the first electrode, the interface between the second sealing portion and the second electrode, and the interface between the first sealing portion and the second sealing portion. Also, the first sealing portion and the second sealing portion are bonded via a mixed layer that comprises a mixture of the resin included in the first sealing portion, an oxide of the resin, the resin included in the second sealing portion, and an oxide of the resin. Therefore, leakage of the volatile component in the electrolyte can be sufficiently suppressed, and intrusion of external moisture into the electrolyte can likewise be suppressed as well, even when excessive stress acts between the first sealing portion and the second sealing portion. Drops of photoelectric conversion efficiency over time can be sufficiently suppressed as a result.

In the above dye-sensitized solar cell, preferably, a groove is formed by a first surface of the first sealing portion, on the opposite side to the electrolyte layer, and a second surface of the second sealing portion on the opposite side to the electrolyte layer and a resin sealing portion, comprising a resin and covering at least one from among a boundary line of the sealing portion and the first electrode, and a boundary line of the sealing portion and the second electrode, is provided on the sealing portion so as to penetrate into the groove, on the opposite side to the electrolyte layer.

In this case, the resin sealing portion penetrates into the groove formed by the first surface of the first sealing portion and the second surface of the second sealing portion. Accordingly, the contact surface area between the resin sealing portion and the sealing portion is greater, and thus the sealing portion and the resin sealing portion can be bonded yet more strongly than in the case where no groove is formed. As a result, leakage of the volatile component in the electrolyte can be suppressed yet more fully, and intrusion of external moisture into the electrolyte can likewise be suppressed yet more fully. Drops in photoelectric conversion efficiency over time can therefore be suppressed yet more fully.

In the present invention, the feature "having flexibility" of the first electrode or the second electrode refers to a maximum deformation rate in excess of 20% for the flexing of the electrode when both long-side edges (each 5 mm wide) of a 50 mm×200 mm sheet-like electrode are fixed horizontally under a tension of 1N and a 20 g load is applied on the center of the electrode, in an environment at 20° C. The maximum deformation rate is the value calculated on the basis of the following formula: maximum deformation rate (%)=100× (maximum displacement/sheet-like electrode thickness). Therefore, the maximum deformation rate is 25%, and the sheet-like electrode is accordingly a flexible electrode, when, for instance, a 0.04 mm-thick sheet-like electrode flexes by being loaded as described above and a maximum displacement becomes 0.01 mm.

The invention provides a dye-sensitized solar cell manufacturing method that allows manufacturing a dye-sensitized solar cell in which drops in photoelectric conversion efficiency over time can be sufficiently suppressed.

BRIEF DESCRIPTION OF THE DRAWINGS

FIG. 6 is a cross-sectional diagram illustrating a first sealing portion formation step in an embodiment of the dye-sensitized solar cell manufacturing method of the present invention;

MODE FOR CARRYING OUT THE INVENTION

Embodiments of the present invention are explained in detail below with reference to drawings.

Figure 1:
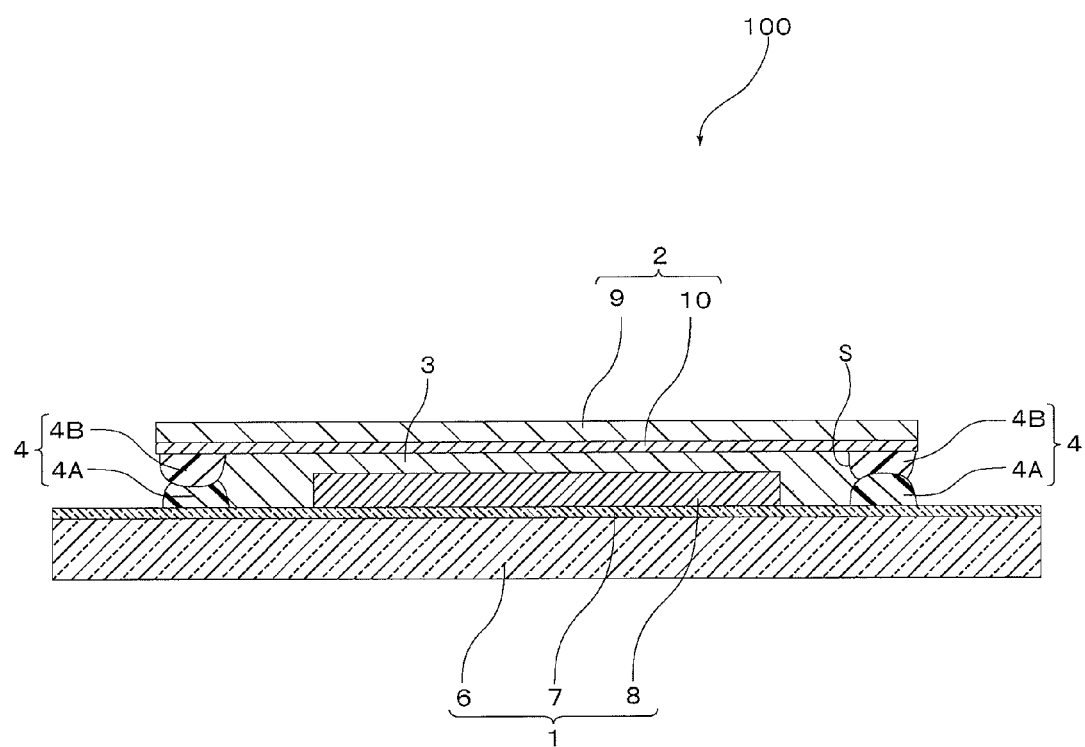
FIG. 1 is a cross-sectional diagram illustrating a dye-sensitized solar cell obtained according to an embodiment of the dye-sensitized solar cell manufacturing method of the present invention.
Figure 2:
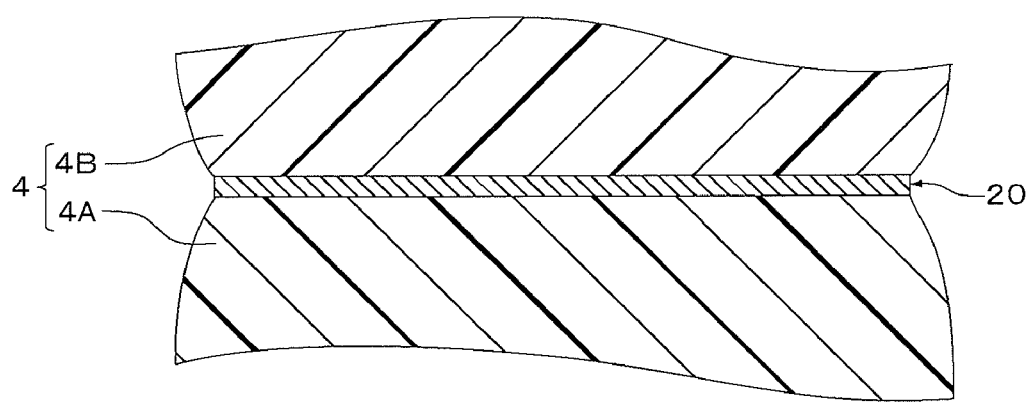
FIG. 2 is a partial cross-sectional diagram illustrating schematically the vicinity of an interface between a first sealing portion and a second sealing portion in FIG. 1.
Figure 3:
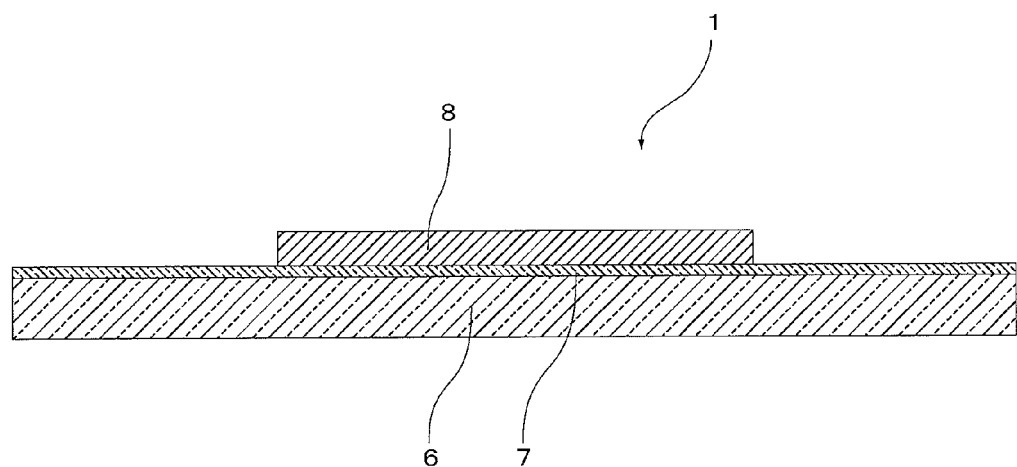
FIG. 3 is a cross-sectional diagram illustrating a first electrode used in an embodiment of the dye-sensitized solar cell manufacturing method of the present invention.
Figure 4:
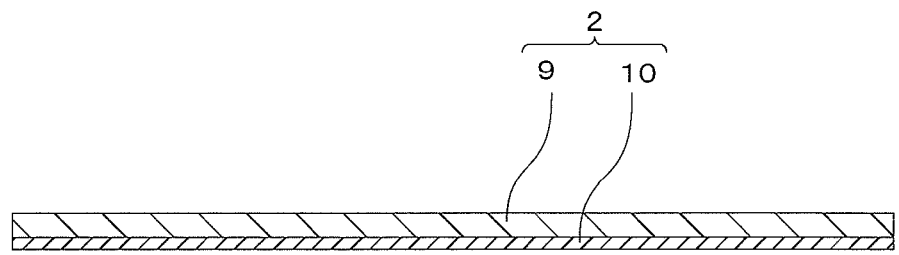
FIG. 4 is a cross-sectional diagram illustrating a second electrode used in an embodiment of the dye-sensitized solar cell manufacturing method of the present invention.
Figure 5:
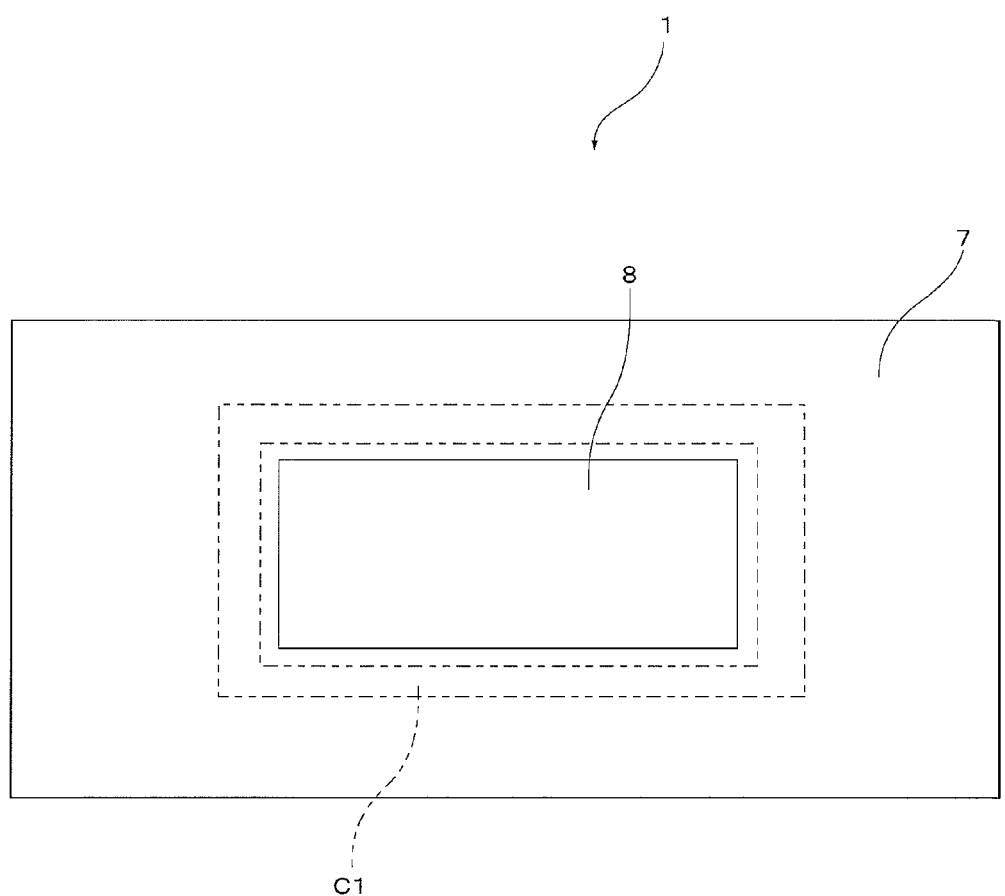
FIG. 5 is a plan-view diagram illustrating the first electrode of FIG. 3.
Figure 7:
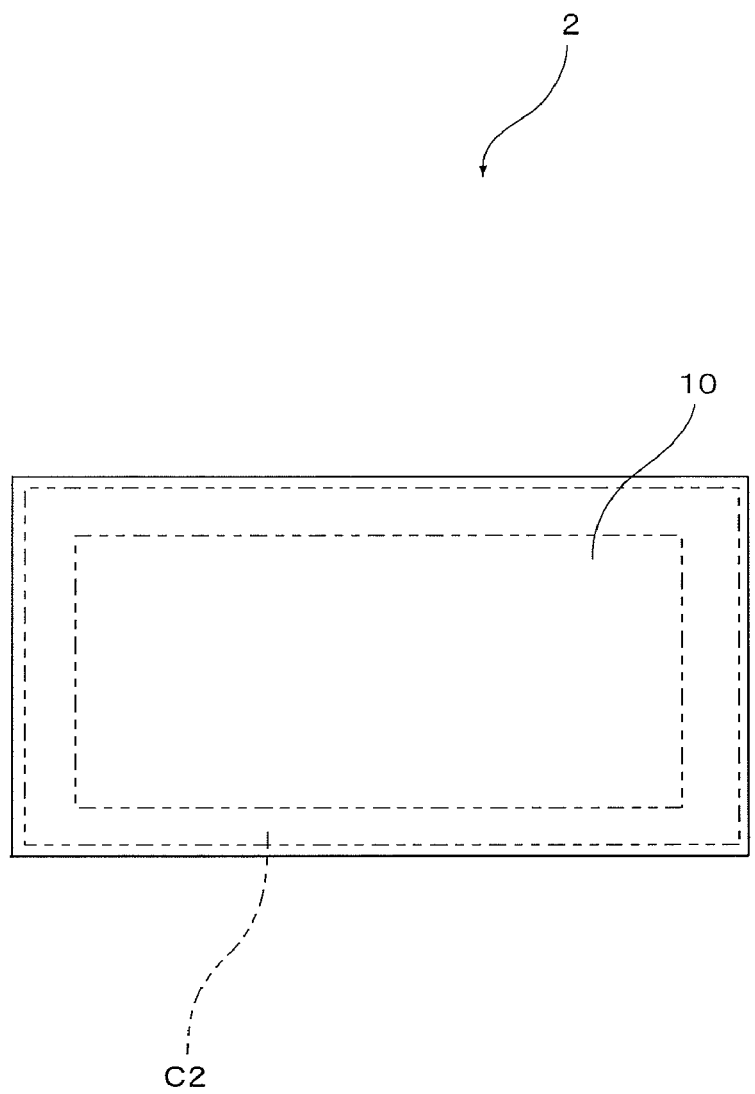
FIG. 7 is a plan-view diagram illustrating the second electrode of FIG. 4.

Embodiments of the dye-sensitized solar cell manufacturing method of the present invention will be explained using FIG. 1 to FIG. 10. FIG. 1 is a cross-sectional diagram illustrating a dye-sensitized solar cell obtained according to an embodiment of the dye-sensitized solar cell manufacturing method of the present invention. FIG. 2 is a partial cross-sectional diagram illustrating schematically the vicinity of an interface between a first sealing portion and a second sealing portion in FIG. 1. FIG. 3 is a cross-sectional diagram illustrating a first electrode used in the present embodiment. FIG. 4 is a cross-sectional diagram illustrating a second electrode used in the present embodiment. FIG. 5 is a plan-view diagram illustrating the first electrode of FIG. 3. FIG. 7 is a plan-view diagram illustrating the second electrode of FIG. 4. FIG. 6 and FIG. 8 to FIG. 10 are cross-sectional diagrams illustrating steps of the manufacturing method of the present embodiment.

As illustrated in FIG. 1, a dye-sensitized solar cell 100 comprises a working electrode 1 and a counter electrode 2 disposed so as to oppose the working electrode 1. A photosensitive dye is supported on the working electrode 1. The working electrode 1 and the counter electrode 2 are joined by way of a sealing portion 4. A cell space S surrounded by the working electrode 1, the counter electrode 2 and the sealing portion 4 is filled with an electrolyte that forms an electrolyte layer 3.

The working electrode 1 comprises a transparent substrate 6, a transparent conductive film 7 provided on the transparent substrate 6, on the side of the counter electrode 2, and a porous oxide semiconductor layer 8, provided on the transparent conductive film 7. The photosensitive dye is supported on the porous oxide semiconductor layer 8 of the working electrode 1. The counter electrode 2 comprises a counter electrode substrate 9 and a conductive catalyst layer 10, provided on the counter electrode substrate 9, on the side of the working electrode 1, that promotes reduction reactions at the surface of the counter electrode 2.

The sealing portion 4 joins the working electrode 1 and the counter electrode 2, and comprises a first sealing portion 4A and a second sealing portion 4B bonded to the first sealing portion 4A. The first sealing portion 4A is fixed to the surface of the working electrode 1, on the side of the porous oxide semiconductor layer 8, i.e. is fixed on the surface of the transparent conductive film 7, and comprises a thermoplastic resin. The second sealing portion 4B is fixed to the surface of the catalyst layer 10 of the counter electrode 2, and comprises a thermoplastic resin.

The first sealing portion 4A and the second sealing portion 4B are bonded to each other via a mixed layer 20 that comprises a mixture of the thermoplastic resin included in the first sealing portion 4A and an oxide of the thermoplastic resin, and thermoplastic resin included in the second sealing portion 4B, and an oxide of the thermoplastic resin, as illustrated in FIG. 2.

A method for manufacturing the above-described dye-sensitized solar cell 100 is explained next.

[Preparation Step]

Firstly, a working electrode (first electrode) 1 and a counter electrode (second electrode) 2 are prepared as described below.

(Working Electrode)

The working electrode 1 can be obtained as described below (FIG. 3).

Firstly, a stack is formed by forming the transparent conductive film 7 on the transparent substrate 6. As the method for forming the transparent conductive film 7, for instance, sputtering, vapor deposition, spray pyrolysis deposition (SPD), CVD or the like is used. Spray pyrolysis deposition is preferred among the foregoing in terms of equipment cost.

The material that makes up the transparent substrate 6 may be, for instance, a transparent material, examples whereof include a glass such as borosilicate glass, soda lime glass, quartz glass, glass which is made of soda lime and whose iron component is less that of ordinary soda lime glass, or polyethylene terephthalate (PET), polyethylene naphthalate (PEN), polycarbonate (PC) or polyether sulfone (PES). The thickness of the transparent substrate 6 is appropriately decided in accordance with the size of the dye-sensitized solar cell 100, and is not particularly limited, but may range, for instance, from 50 μm to 10000 μm.

The material that makes up the transparent conductive film 7 may be, for instance, a conductive metal oxide such as indium tin oxide (ITO), tin oxide ($SnO_2$), fluorine-doped tin oxide (PTO) or the like. The transparent conductive film 7 may be a single layer or a stack of a plurality of layers made up of dissimilar conductive metal oxides. In case that the transparent conductive film 7 is made up of a single layer, the transparent conductive film 7 is comprises preferably FTO, on account of the high heat resistance and chemical resistance of the latter. Preferably, a stack made up of a plurality of layers is used as the transparent conductive film 7, since in this case the characteristics of the respective layers can be reflected in the transparent conductive film 7. Preferably, there is used a stack of a layer comprising ITO and a layer comprising FTO. In this case there can be obtained a transparent conductive film 7 having high conductivity, heat resistance and chemical resistance. The thickness of the transparent conductive film 7 may range from 0.01 µm to 2 µm.

A paste for forming a porous oxide semiconductor layer is then printed on the transparent conductive film 7 of the stack thus obtained as described above. The paste for forming the porous oxide semiconductor layer comprises, besides the above-described oxide semiconductor particles, also a resin such as polyethylene glycol and a solvent such as terpineol. The method for printing the paste for forming a porous oxide semiconductor layer may be, for instance, screen printing method, doctor blade method or bar coating method.

The paste for forming a porous oxide semiconductor layer is baked to form the transparent conductive film 7 on the porous oxide semiconductor layer 8. The baking temperature varies depending on the oxide semiconductor particles, but ranges ordinarily from 350° C. to 600° C. The baking time varies depending on the oxide semiconductor particles, but ranges ordinarily from 1 to 5 hours.

Examples of the oxide semiconductor particles include, for instance, oxide semiconductor particles comprising titanium oxide ($TiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$) or aluminum oxide ($Al_2O_3$), or two or more of the foregoing. The average particle size of these oxide semiconductor particles is preferably 1 to 1000 nm, since the surface area of the oxide semiconductor covered with dye increases, or in other words the site for photoelectric conversion becomes larger, thereby enabling the generation of a larger number of electrons. Preferably, the porous oxide semiconductor layer 8 comprises a stack resulting from stacking oxide semiconductor particles having dissimilar particle size distributions. In this case, reflection of light can be repeatedly induced within the stack, thereby making it possible to effectively convert light to electrons without allowing incident light to escape outside the stack. Light can be converted thus into electrons with high efficiency. The thickness of the porous oxide semiconductor layer 8 may range, for instance, from 0.5 to 50 µm. The porous oxide semiconductor layer 8 can be made up of a stack of a plurality of semiconductor layers comprising dissimilar materials.

(Counter Electrode)

On the other hand, the counter electrode 2 can be obtained as described below (FIG. 4).

Namely, a counter electrode substrate 9 is prepared first. A catalyst layer 10 is formed on the counter electrode substrate 9. The method used for forming the catalyst layer 10 may be, for instance, sputtering or vapor deposition. Among these, sputtering is preferred in terms of film uniformity.

The counter electrode substrate 9 is made up of a metal material having good corrosion resistance, for instance titanium, nickel, platinum, molybdenum, tungsten or the like; a conductive oxide such as ITO, or FTO; carbon; or a conductive polymer. The thickness of the counter electrode substrate 9 is decided appropriately in accordance with the size of the dye-sensitized solar cell 100, and is not particularly limited, but may range, for instance, from 0.005 mm to 0.1 mm.

The catalyst layer 10 comprises, for instance, platinum, a carbon-based material, or a conductive polymer.

[First Sealing Portion Formation Step]

Next, the first sealing portion 4A is formed at a first annular section C1 that is a section on the surface of the transparent conductive film 7 of the working electrode 1 and that surrounds the porous oxide semiconductor layer 8 as illustrated in FIG. 5 and FIG. 6. The first sealing portion 4A can be obtained by melting a thermoplastic resin through heating, to bond thereby the resin to the transparent conductive film 7.

[Second Sealing Portion Formation Step]

Figure 8:
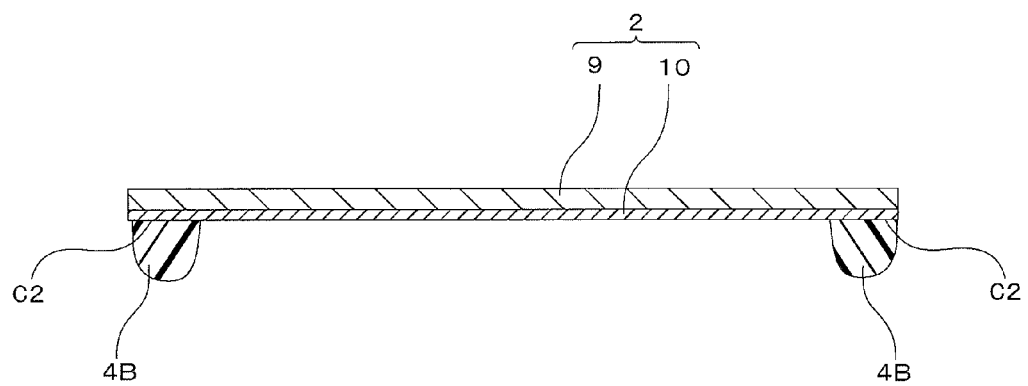
FIG. 8 is a cross-sectional diagram illustrating a second sealing portion formation step in an embodiment of the dye-sensitized solar cell manufacturing method of the present invention.

On the other hand, the second sealing portion 4B is formed on the second annular section C2, which is a section on the surface of the catalyst layer 10 of the counter electrode 2, as illustrated in FIG. 7 and FIG. 8. The second sealing portion 4B can be obtained by melting a thermoplastic resin through heating, to bond thereby the resin to the catalyst layer 10.

As thermoplastic resins that form the first sealing portion 4A and the second sealing portion 4B there is preferably used, for instance, acid-modified polyethylene, polyvinyl alcohol or an ethylene-vinyl alcohol copolymer. Leakage of the electrolyte through the first sealing portion 4A or the second sealing portion 4B can be sufficiently suppressed in this case yet more fully. Herein, the term acid-modified polyethylene denotes polyethylene that is random-copolymerized, alternately copolymerized, block-copolymerized or graft-copolymerized with an acid, or polyethylene in which the foregoing are neutralized with metal ions. As an example thereof, an ethylene-methacrylic acid copolymer is an acid-modified polyethylene obtained through copolymerization of ethylene and methacrylic acid. An ionomer in which an ethylene-methacrylic acid copolymer is neutralized with metal ions is likewise an acid-modified polyethylene.

In terms of enhancing adhesion between the first sealing portion 4A and the second sealing portion 4B, the materials that make up the first sealing portion 4A and the second sealing portion 4B are preferably combinations of resins selected from the group of the above acid-modified polyethylene. In a preferred combination, for instance, the resin that makes up the first sealing portion 4A comprises an ionomer, and the resin that makes up the second sealing portion 4B comprises maleic anhydride-modified polyethylene. In an alternative preferred combination, for instance, the resin that makes up the first sealing portion 4A comprises maleic anhydride-modified polyethylene, and the resin that makes up the second sealing portion 4B comprises an ionomer.

In this case, acid-modified polyethylene has a comparatively lower melting point than polyvinyl alcohol or ethylene vinyl alcohol copolymers. As a result, the resins of the first sealing portion 4A and the second sealing portion 4B are fusion-bonded readily at a comparatively low temperature. Even if the resins of the first sealing portion 4A and of the second sealing portion 4B are different kinds of acid-modified polyethylene, the resins have still good compatibility, since the monomers are ethylene, and bondability and adhesion between the first sealing portion 4A and the second sealing portion 4B are excellent in a below-described sealing portion formation step.

More preferably, the materials that make up the first sealing portion 4A and the second sealing portion 4B are a same resin selected from the group of the above acid-modified polyethylene. In a preferred combination, for instance, the resin that makes up the first sealing portion 4A and the resin that makes up the second sealing portion 4B comprise the same ionomer. In an alternative preferred combination, the resin that makes up the first sealing portion 4A and the resin that makes up the second sealing portion 4B comprise the same maleic anhydride-modified polyethylene.

Herein, the term same resin denotes obviously a resin having the same mole ratio of acid monomer modifying polyethylene with respect to ethylene repeat units, but also resins having a different such mole ratio. For instance, an ethylene-methacrylic acid copolymer wherein the mole ratio of acid monomer with respect to ethylene repeat units is 5% is the same resin as an ethylene-methacrylic acid copolymer wherein the mole ratio of acid monomer with respect to ethylene repeat units is 10%. In this case, the melting point, melt flow rate and other thermal characteristics of the resins that are used are similar, and hence the resins are readily fusion-bonded to each other at the same timing. As a result, the melting heating time can be controlled easily, which in turn facilitates a below-described sealing portion formation step, as compared with cases in which there are used resins having significantly dissimilar melting points and melt flow rates.

[Dye Support Step]

Next, the photosensitive dye is supported onto the porous oxide semiconductor layer 8 of the working electrode 1. In order to accomplish this, the photosensitive dye is adsorbed onto the porous oxide semiconductor layer 8 by immersing the working electrode 1 in a solution containing the photosensitive dye to adsorb the dye onto the porous oxide semiconductor layer 8 followed by rinsing off excess dye with a solvent component of the above-mentioned solution and drying. However, the photosensitive dye can also be supported onto the porous oxide semiconductor layer 8 by adsorbing the photosensitive dye onto an oxide semiconductor porous film by coating a solution containing the photosensitive dye onto the porous oxide semiconductor layer 8 followed by drying.

Examples of the photosensitive dye include, for instance, ruthenium complexes having ligands that comprise a bipyridine structure, a terpyridine structure or the like, or an organic dye such as porphyrin, eosin, rhodamine, merocyanine or the like.

[Electrolyte Layer Formation Step]

Figure 9:
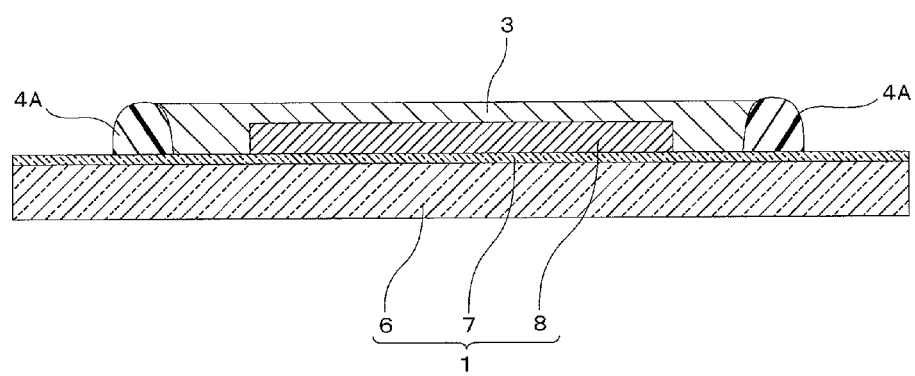
FIG. 9 is a cross-sectional diagram illustrating an electrolyte layer formation step in an embodiment of the dye-sensitized solar cell manufacturing method of the present invention.

Next, as illustrated in FIG. 9, an electrolyte is disposed within the first sealing portion 4A, on the working electrode 1, to form the electrolyte layer 3. The electrolyte layer 3 can be obtained by infusing or printing the electrolyte within the first sealing portion 4A, on the working electrode 1.

Here, in the case the electrolyte is a liquid, the electrolyte is preferably injected until it overflows beyond the sealing portion 4A to the outside of the sealing portion 4A. In this case, the electrolyte can be adequately injected to the inside of the sealing portion 4A. In addition, when adhering the sealing portion 4A and the counter electrode 2B, air can be adequately evacuated from the cell space surrounded by the working electrode 1, the counter electrode 2 and the sealing portion 4, thereby making it possible to adequately improve photoelectric conversion efficiency. The first sealing portion 4A and the second sealing portion 4B are both thermoplastic resins, and hence, there is sufficiently reduced the drop in bonding strength, caused by a loss of wettability, during bonding of the first sealing portion 4A and the second sealing portion 4B, so that the first sealing portion 4A and the second sealing portion 4B can be bonded strongly, even if electrolyte wets the bonding section of the first sealing portion 4A when the electrolyte overflows beyond the first sealing portion 4A to the outside of the first sealing portion 4A.

In the electrolyte layer formation step, the amount of electrolyte that is coated within the first sealing portion 4A is calculated beforehand, so that the electrolyte can be applied without overflowing beyond the first sealing portion 4A. In this case, theoretically, no electrolyte is wasted, as no electrolyte overflows beyond the first sealing portion 4A. In this case as well, the first sealing portion 4A comprising a thermoplastic resin is disposed beforehand on the working electrode 1, and the second sealing portion 4B comprising a thermoplastic resin is disposed beforehand on the counter electrode 2. As a result, strong bonding between the first sealing portion 4A and the second sealing portion 4B is preserved even if part of the electrolyte layer 3 evaporates and becomes adhered to the first sealing portion 4A and the second sealing portion 4B. More preferably, the electrolyte is applied after calculation of the amount of electrolyte necessary for enabling air to be sufficiently removed from the space surrounded by the working electrode 1, the counter electrode 2 and the sealing portion 4, during application of the electrolyte.

The electrolyte comprises ordinarily an electrolyte solution. The electrolyte solution comprises a redox pair such as $I^-/I_3^-$ and an organic solvent. As the organic solvent there can be used, for instance, acetonitrile, methoxyacetonitrile, methoxypropionitrile, propionitrile, ethylene carbonate, propylene carbonate, diethyl carbonate, γ-butyrolactone or the like. Examples of redox pairs include, for instance, a pair of bromine/bromide ions, besides $I^-/I_3^-$. The dye-sensitized solar cell 100 is particularly effective when using as an electrolyte an electrolyte solution that comprises a volatile solute such as $I^-/I_3^-$, as a redox pair, and an organic solvent that evaporates readily at high temperature, such as acetonitrile, methoxyacetonitrile, or methoxypropionitrile. That is because, in this case, the change in inner pressure in the cell space S, on account of changes in the environment temperature around the dye-sensitized solar cell 100, becomes particularly large, and electrolyte leaks readily through the interface between the sealing portion 4 and the counter electrode 2 and through the interface between the sealing portion 4 and the working electrode 1. A gelling agent may be added to the volatile solvent. The electrolyte may be made up of an ionic liquid electrolyte comprising a, mixture of an ionic liquid and a volatile component. That is because, in this case as well, the change in inner pressure in the cell space S, on account of changes in the environment temperature around the dye-sensitized solar cell 100, becomes particularly large. As the ionic liquid there is used, for instance, a known iodine salt being room-temperature molten salt that is in a molten state around room temperature, such as a pyridinium salt, imidazolium salt or triazolium salt. As such a room-temperature molten salt there is preferably used, for instance, 1-ethyl-3-methyl imidazolium bis (trifluoromethylsulfonyl)imide. Examples of the volatile component include, for instance, the above organic solvent, 1-methyl-3-methyl imidazolium iodide, LiI, $I_2$, 4-t-butylpyridine or the like. As the electrolyte 3 there may be used, for instance, a nanocomposite ion gel electrolyte, which is a pseudo-solid electrolyte that becomes gel-like by mixing nanoparticles such as $SiO_2$, $TiO_2$, carbon nanotubes or the like with the above ionic liquid electrolyte. There may also be used an ionic liquid electrolyte that is gelled using an organic gelling agent such as polyvinylidene fluoride, a polyethylene oxide derivative, an amino acid derivative or the like.

[Sealing Portion Formation Step]

Figure 10:
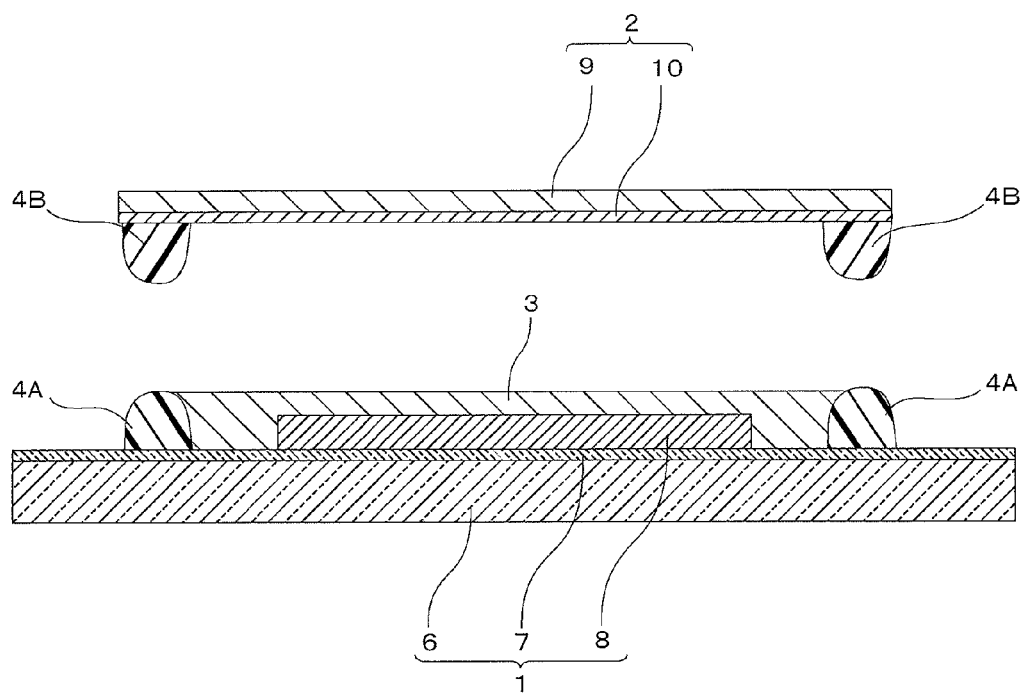
FIG. 10 is a cross-sectional diagram illustrating a sealing portion formation step in an embodiment of the dye-sensitized solar cell manufacturing method of the present invention.

Next, as illustrated in FIG. 10, the working electrode 1 and the counter electrode 2 are opposed to each other, and the first sealing portion 4A and the second sealing portion 4B are superposed. The first sealing portion 4A and the second sealing portion 4B are melted while being pressed, to bond thereby the first sealing portion 4A and the second sealing portion 4B. The sealing portion 4 is formed thus between the working electrode 1 and the counter electrode 2 (see FIG. 1). At this time, a layer different from the first sealing portion 4A and the second sealing portion 4B is observed between the first sealing portion 4A and the second sealing portion 4B. As the reason why such a layer is observed it is thought that breakage of the oxide coat on the first sealing portion 4A and breakage of the oxide coat on the second sealing portion 4B, in part of the portion at which the first sealing portion 4A and the second sealing portion 4B come into contact occur, the unoxidized thermoplastic resin included in the first sealing portion 4A, and the unoxidized thermoplastic resin included in the second sealing portion 4B, intrude into the breakage portions, and mix with each other and as a result formed is the mixed layer 20 that comprises a mixture of the thermoplastic resin included in the first sealing portion 4A, an oxide of the thermoplastic resin, and the thermoplastic resin included in the second sealing portion 4B and an oxide of the thermoplastic resin. The mixed layer 20 is thought to be formed more specifically as follows.

Namely, the surface of the first sealing portion 4A is oxidized beforehand, prior to bonding between the first sealing portion 4A and the second sealing portion 4B and as a result the surface layer portion of the first sealing portion 4A becomes an oxide coat of the thermoplastic resin included in the first sealing portion 4A. The surface of the second sealing portion 4B as well, is oxidized beforehand, prior to bonding between the first sealing portion 4A and the second sealing portion 4B and as a result the surface layer portion of the second sealing portion 4A becomes an oxide coat of the thermoplastic resin included in the second sealing portion 4B. When the first sealing portion 4A and the second sealing portion 4B are melted while being pressed, part of the respective oxide coats break, and unoxidized resins from within the oxide coats ooze out and become mixed. The mixed layer 20 is thought to be formed this way. Specifically, it is further thought that, as a result, the thermoplastic resin included in the first sealing portion 4A and the thermoplastic resin included in the second sealing portion 4B become mixed with each other at the breakage portions in the oxide coats formed on the surfaces of the first sealing portion 4A and the second sealing portion 4B, and the unbroken remaining portion in the oxide coat formed on the surface of the first sealing portion 4A, and the unbroken remaining portion of the oxide coat formed on the surface of the second sealing portion 4B, become superposed on each other, at the mixed layer 20. The first sealing portion 4A and the second sealing portion 4B are bonded thus to each other via the mixed layer 20.

At this time, the first sealing portion 4A and the second sealing portion 4B are pressed ordinarily at 1 to 50 MPa, preferably at 2 to 30 MPa and more preferably at 3 to 20 MPa.

The temperature during melting of the first sealing portion 4A and the second sealing portion 4B may be at or above the melting point of the thermoplastic resins that form the first sealing portion 4A and the second sealing portion 4B. When that temperature is lower than the melting point of the thermoplastic resins, the thermoplastic resins that form the first sealing portion 4A and the second sealing portion 4B do not melt, and, as a result, the sealing portion 4 fails to be formed through bonding of the first sealing portion 4A and the second sealing portion 4B.

Preferably, the temperature at which the first sealing portion 4A and the second sealing portion 4B are caused to melt is not higher than (melting point of the thermoplastic resins +200° C.). The thermoplastic resins included in the first sealing portion 4A and the second sealing portion 4B might decompose through heating if the above temperature exceeds (the melting point of the thermoplastic resins+200° C.).

The dye-sensitized solar cell 100 is thus obtained and the manufacture of the dye-sensitized solar cell 100 is completed.

In the above-described manufacturing method of the dye-sensitized solar cell 100, the first sealing portion 4A and the second sealing portion 4B are formed before formation of the electrolyte layer 3. Therefore, the volatile component in the electrolyte does not adhere to the first annular section C1, and the wettability of the surface thereof is not impaired, upon formation of the first sealing portion 4A at the first annular section C1 of the working electrode 1. Therefore, the thermoplastic resin is strongly bonded at the first annular section C1, and the first sealing portion 4A is solidly fixed to the first annular section C1. Likewise, the volatile component in the electrolyte does not adhere to the surface of the catalyst layer 10, and the wettability of the surface thereof is not impaired, upon formation of the second sealing portion 4B at the second annular section C2 of the catalyst layer 10. Therefore, the thermoplastic resin is strongly bonded at the second annular section C2 of the catalyst layer 10, and the second sealing portion 4B is solidly fixed to the second annular section C2 of the catalyst layer 10.

On the other hand, the sealing portion 4 is formed after formation of the electrolyte layer 3. As a result, part of the electrolyte layer 3 evaporates, and wettability between the first sealing portion 4A and the second sealing portion 4B decreases, accompanying the melting of the first sealing portion 4A and the second sealing portion 4B. In some cases, the electrolyte adheres to the first sealing portion 4A and the second sealing portion 4B during the electrolyte layer formation step, and the wettability between the first sealing portion 4A and the second sealing portion 4B decreases.

Herein, however, the first sealing portion 4A and the second sealing portion 4B comprise thermoplastic resins, and hence the thermoplastic resins are caused to be bonded to each other when the first sealing portion 4A and the second sealing portion 4B are bonded. As a result, the first sealing portion 4A and the second sealing portion 4B bond more readily to each other as compared with a case in which the thermoplastic resins are caused to be bonded to the working electrode 1 or the counter electrode 2. Also, the first sealing portion 4A and the second sealing portion 4B are pressed while both are bonded. Even if electrolyte adheres to the first sealing portion 4A and the second sealing portion 4B, therefore, the adhered electrolyte is removed by being driven out, and the molten thermoplastic resin of the first sealing portion 4A and the molten thermoplastic resin of the second sealing portion 4B dissolve into each other, on account of the flow of the thermoplastic resins in the first sealing portion 4A and the second sealing portion 4B. The first sealing portion 4A and the second sealing portion 4B become strongly bonded thereby. It is also thought to be one of the reasons for the strong bonding between the first sealing portion 4A and the second sealing portion 4B that the first sealing portion 4A and the second sealing portion 4B are bonded via the interposed mixed layer 20 that comprises a mixture of the resin included in the first sealing portion 4A, an oxide of the resin, as well as the resin included in the second sealing portion 4B, and an oxide of the resin. In some cases, the electrolyte may become partially trapped within the sealing resin, depending on the viscosity of the adhered electrolyte and on the compatibility thereof with the sealing resin. The trapping ratio, however, is lowered, and bonding between the first sealing portion 4A and the second sealing portion 4B is kept strong, through pressing of the first sealing portion 4A and the second sealing portion 4B.

In the manufacturing method of the dye-sensitized solar cell 100, thus, even if the cell space S shrinks or expands when the obtained dye-sensitized solar cell is exposed to an environment of large temperature differences, the stress generated thereupon is dispersed over the interface between the first sealing portion 4A and the working electrode 1, the interface between the second sealing portion 4B and the counter electrode 2, and the interface between the first sealing portion 4A and the second sealing portion 4B. Also, the first sealing portion 4A is solidly fixed to the first annular section C1 of the working electrode 1, and the second sealing portion 4B is solidly fixed to the second annular section C2 of the counter electrode 2. Further, the first sealing portion 4A and the second sealing portion 4B are strongly bonded to each other. Therefore, leakage of the volatile component in the electrolyte can be sufficiently suppressed in the obtained dye-sensitized solar cell 100 even if the cell space S shrinks or expands when the obtained dye-sensitized solar cell 100 is exposed to an environment of large temperature differences. Intrusion of external moisture into the electrolyte is sufficiently suppressed as well. The manufacturing method of the dye-sensitized solar cell 100, therefore, allows manufacturing a dye-sensitized solar cell in which drop of photoelectric conversion efficiency over time can be sufficiently suppressed.

In the present embodiment, the electrolyte layer 3 is formed on the working electrode 1, within the first sealing portion 4A, in the electrolyte layer formation step. As a result, the sealing portion 4 is formed after the electrolyte has thoroughly spread into the fine pores of the porous oxide semiconductor layer 8. Formation of air bubbles in the porous oxide semiconductor layer 8 is sufficiently suppressed thereby, and photoelectric conversion efficiency can be enhanced yet more fully.

In the present embodiment, preferably, the sealing portion 4 is formed within a reduced-pressure space. In this case, the electrolyte layer 3 can be brought to a negative pressure state, with respect to external air, when the obtained dye-sensitized solar cell 100 is taken out into the atmosphere. The dye-sensitized solar cell 100 is subjected as a result to atmospheric pressure from outside, and there is maintained the state in which the working electrode 1 and the counter electrode 2 apply compressive force onto the sealing portion 4. Leakage of volatile component in the electrolyte layer 3 can be sufficiently suppressed as a result.

The above-described reduced-pressure space can be formed for instance as described below.

Namely, the working electrode 1 provided with the first sealing portion 4A is first placed into a reduced-pressure vessel, through an opening of the vessel. Next, electrolyte is injected within the first sealing portion 4A, to form thereby the electrolyte layer 3. Thereafter, the counter electrode 2 provided with the second sealing portion 4B is placed in the reduced-pressure vessel, and the working electrode 1 and the counter electrode 2 are opposed to each other inside the reduced-pressure vessel, to superpose thereby the first sealing portion 4A and the second sealing portion 4B. Next, the opening of the reduced-pressure vessel is sealed using a flexible sheet comprising a resin such as PET, to form an airtight space inside the reduced-pressure vessel. The airtight space is evacuated, for instance, using a vacuum pump, via an evacuation hole (not shown) formed in the reduced-pressure vessel. Thus, the reduced-pressure space is formed.

The counter electrode 2 is compressed by the flexible sheet when the reduced-pressure space is formed as described above. As a result, the first sealing portion 4A and the second sealing portion 4B are clamped and pressed together by the working electrode 1 and the counter electrode 2. When the reduced-pressure vessel is then heated, and the first sealing portion 4A and the second sealing portion 4B are melted while being pressed, the first sealing portion 4A and the second sealing portion 4B are bonded to each other, and the sealing portion 4 is formed.

The pressure in the reduced-pressure space ranges ordinarily from 50 Pa to less than 1013 hPa, preferably from 50 to 800 Pa, and more preferably from 300 to 800 Pa.

In particular, the pressure in the reduced-pressure space ranges preferably from 700 to 1000 Pa, more preferably from 700 to 800 Pa, when the organic solvent included in the electrolyte is a volatile solvent. When the pressure lies within the above ranges, evaporation of the organic solvent can be further suppressed during formation of the electrolyte layer 3 within the first sealing portion 4A; the working electrode 1, the counter electrode 2 and the sealing portion 4 are more solidly fixed to each other in the obtained dye-sensitized solar cell 100; and leakage in the electrolyte layer 3 is less likely to occur; as compared with a case where the pressure lies outside the above ranges.

In a case where the electrolyte comprises an ionic liquid, there is no need for raising the pressure in the reduced-pressure space, with electrolyte evaporation in mind, as in the case where the electrolyte comprises a volatile solvent since the ionic liquid does not evaporate. Accordingly, the pressure of the reduced-pressure space may range from 50 to 700 Pa.

In a case where the electrolyte comprises a gel electrolyte, the pressure in a case where a main component of the precursor to be gelled is a volatile component is different from that in a case where a main component of the precursor to be gelled is an ionic liquid. If the main component of the precursor is the volatile component, the pressure ranges preferably from 600 to 800 Pa, and the pressure ranges preferably from 50 to 700 Pa if the main component of the precursor is an ionic liquid. In case that the electrolyte layer 3 comprises a gel electrolyte, therefore, the pressure in the reduced-pressure space ranges preferably from 50 to 800 Pa.

Preferably at least one from among the working electrode 1 and the counter electrode 2 has flexibility, in case that formation of the sealing portion 4 is performed within the reduced-pressure space, as described above.

In this case, the electrode having flexibility from among the working electrode 1 and the counter electrode 2 can flex on account of atmospheric pressure, whereby the spacing between the working electrode 1 and the counter electrode 2 can be narrowed upon removal from the reduced-pressure space and exposure to atmospheric pressure, as compared with a case where neither the working electrode 1 nor the counter electrode 2 has flexibility. As a result, photoelectric conversion takes place more efficiently and photoelectric conversion efficiency is more enhanced, as compared with a case where neither the working electrode 1 nor the counter electrode 2 has flexibility.

Figure 11:
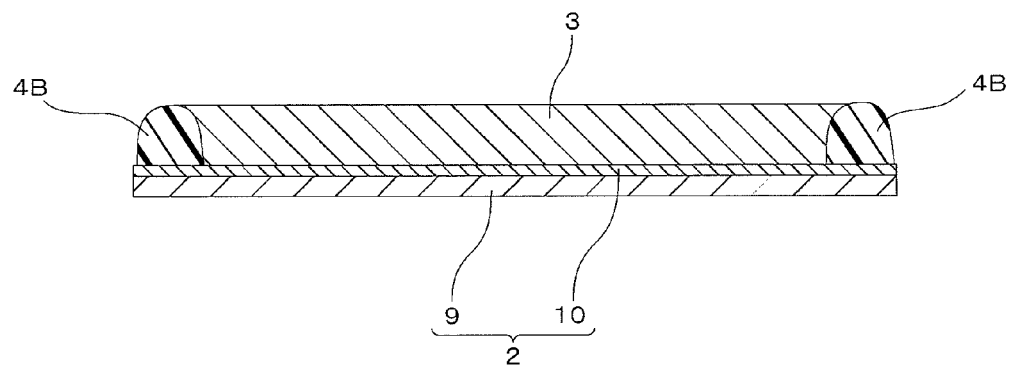
FIG. 11 is a cross-sectional diagram illustrating an electrolyte layer formation step in another embodiment of the dye-sensitized solar cell manufacturing method of the present invention.

The present invention is not limited to the above embodiment. In the above embodiment, for instance, the electrolyte layer 3 is formed within the first sealing portion 4A that is provided on the working electrode 1. However, the electrolyte layer 3 may also be formed on the counter electrode 2, within the second sealing portion 4B that is provided on the counter electrode 2, as illustrated in FIG. 11.

In the above embodiment, the first sealing portion 4A and the second sealing portion 4B are formed before formation of the electrolyte layer 3. However, the second sealing portion 4B may be formed simultaneously with the electrolyte layer 3, or after formation of the electrolyte layer 3. However, in case that the electrolyte layer 3 is formed within the second sealing portion 4B that is provided on the counter electrode 2 as illustrated in FIG. 11, the second sealing portion 4B must be formed before the electrolyte layer 3. In this case, the first sealing portion 4A need not be formed before formation of the electrolyte layer 3, and may be formed simultaneously with the electrolyte layer 3, or after formation of the electrolyte layer 3. The dye support step is carried out then before formation of the sealing portion 4.

Figure 12:
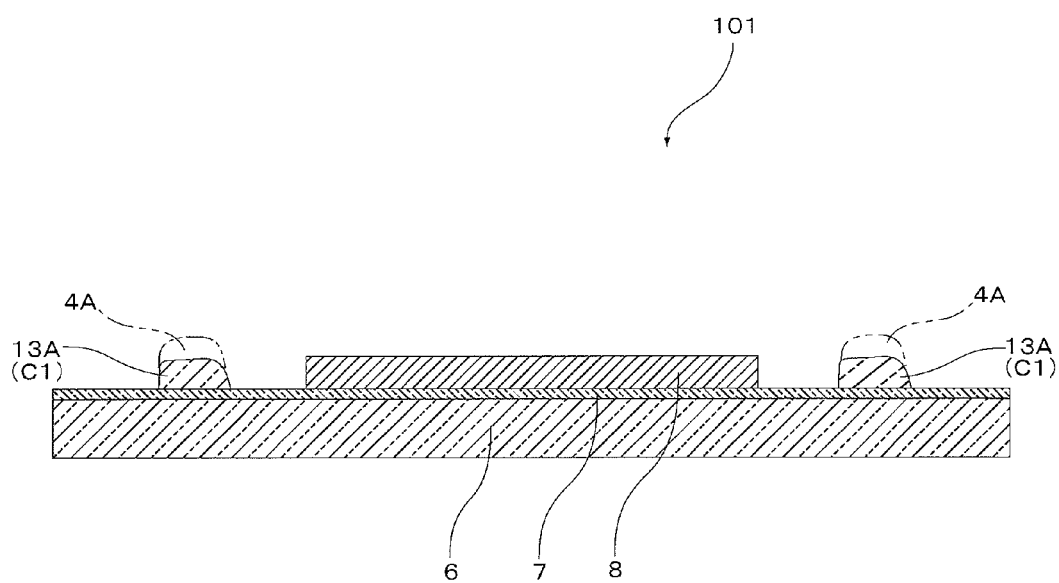
FIG. 12 is a cross-sectional diagram illustrating a variation of the first electrode of FIG. 3.

In the above embodiment, a working electrode 101 further having a protrusion 13A that comprises an inorganic material and that protrudes on the transparent conductive film 7, may be used instead of the working electrode 1, as illustrated in FIG. 12. The protrusion 13A is a section at which the first sealing portion 4A is formed, and constitutes the first annular section C1.

In this case, the protrusion 13A comprising an inorganic material is provided so as to protrude on the transparent conductive film 7, and hence the protrusion 13A has the function of sealing the electrolyte layer 3 together with the sealing portion 4. Since the protrusion 13A comprises an inorganic material, moreover, the protrusion 13A has a higher sealing ability than the first sealing portion 4A and the second sealing portion 4B, which comprise thermoplastic resins. As a result, leakage of electrolyte can be more thoroughly suppressed, as compared with a case in which the working electrode 1 does not have the protrusion 13A.

Figure 13:
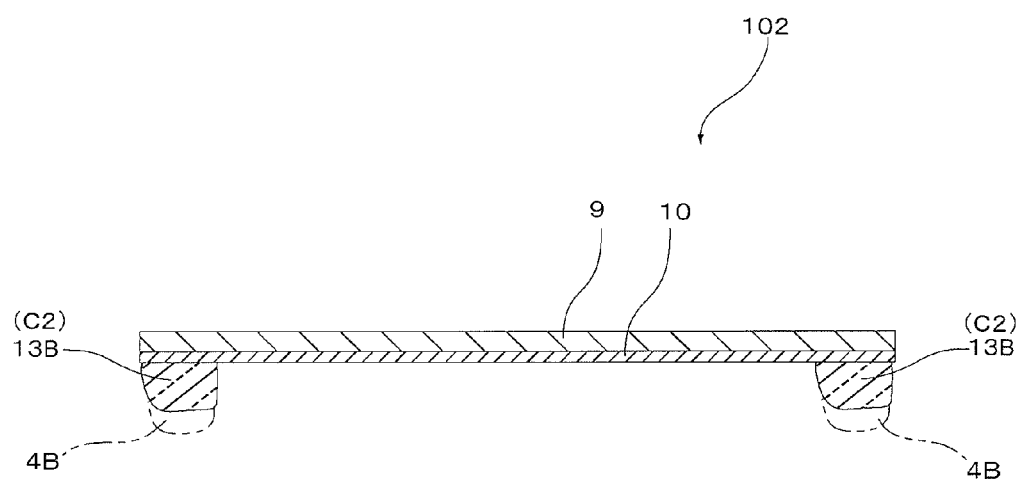
FIG. 13 is a cross-sectional diagram illustrating a variation of the second electrode of FIG. 4.

In the above embodiment there may be used a counter electrode 102 further having a protrusion 13B comprising an inorganic material and that protrudes on the catalyst layer 10, as illustrated in FIG. 13. The protrusion 13B is a site at which the second sealing portion 4B is formed, and constitutes the second annular section C2.

In this case, the protrusion 13B comprising an inorganic material is provided so as to protrude on the transparent catalyst layer 10, and hence the protrusion 13B has the function of sealing the electrolyte layer 3 together with the sealing portion 4. Further, since the protrusion 13B comprises an inorganic material, the protrusion 13B has a higher sealing ability than the first sealing portion 4A and the second sealing portion 4B, which comprise thermoplastic resins. As a result, leakage of electrolyte can be more thoroughly suppressed, as compared with a case in which the counter electrode 2 does not have the protrusion 13B.

As the inorganic material included in the protrusions 13A, 13B, there can be used, for instance, an inorganic insulating material such as a lead-free transparent low-melting point glass frit, or a metallic material such as silver or the like. In particular, preferably, a wiring section formed ordinarily on the working electrode 1 doubles also as the protrusion 13A. The wiring section comprises metallic wiring formed by a metallic material such as silver or the like, and a wiring protective layer, made up of an inorganic insulating material such as a low-melting point glass frit, that covers the metallic wiring.

Figure 14:
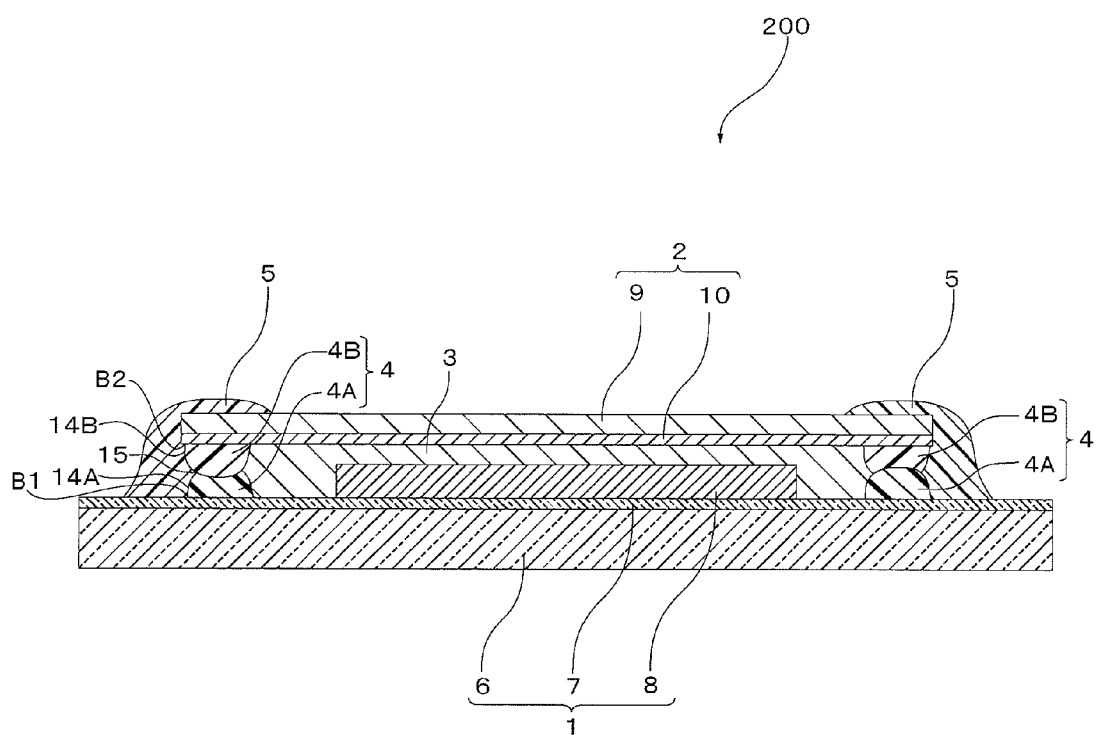
FIG. 14 is a cross-sectional diagram illustrating a dye-sensitized solar cell obtained according to yet another embodiment of the dye-sensitized solar cell manufacturing method of the present invention.

The dye-sensitized solar cell obtained by the dye-sensitized solar cell manufacturing method of the present invention may have a configuration such as that of a dye-sensitized solar cell 200 illustrated in FIG. 14. In the dye-sensitized solar cell 200, a resin sealing portion 5 comprising a resin is provided on the sealing portion 4, on the opposite side to the electrolyte layer 3, covering at least a boundary line B1 between the sealing portion 4 and the working electrode 1 and a boundary line B2 between the sealing portion 4 and the counter electrode 2. Meanwhile, in the sealing portion 4 a groove 15 is formed by a first surface 14A of the first sealing portion 4A on the opposite side to the electrolyte layer 3, and a second surface 14B of the second sealing portion 4B on the opposite side to the electrolyte layer 3. The resin sealing portion 5 penetrates into the groove 15.

Since the resin sealing portion 5 penetrates thus into the groove 15, the contact surface area between the resin sealing portion 5 and the sealing portion 4 becomes greater and thus the sealing portion 4 and the resin sealing portion 5 can be bonded yet more strongly, than in the case where no groove 15 is formed. As a result, leakage of the volatile component in the electrolyte can be suppressed yet more fully, and intrusion of external moisture into the electrolyte can likewise be suppressed yet more fully. The drop of photoelectric conversion efficiency over time can be suppressed yet more fully as a result in the dye-sensitized solar cell 200. A thermoplastic resin, a moisture-curable resin, a thermosetting resin or a UV-curable resin can be used as the resin included in the resin sealing portion 5.

In particular, the second electrode is preferably reinforced by the resin sealing portion 5 in case that the second electrode has flexibility. In this case, the stress generated in a heating-cooling cycle environment can be relieved through flexing of the second electrode in the vicinity of the sealing portion 4. This allows preserving a strong bonding strength between the sealing portion 4B and the second electrode, so that leakage of the volatile component in the electrolyte is suppressed yet more fully.

Preferably, the resin sealing portion 5 has a greater rigidity than the second electrode having flexibility. The reinforcing effect of the resin sealing portion 5 is greater in this case. Herein, the feature "the resin sealing portion 5 has a greater rigidity than the second electrode having flexibility" denotes that the resin sealing portion exhibits a smaller maximum deformation rate than that of the second electrode when both long-side edges (each 5 mm wide) of a sheet-like 50 mm×200 mm resin sealing portion 5 and second electrode are held and fixed with a force such that the flat sheet does not deform, and a 20 g load is placed on the center (at a position 2.5 cm from the edges of the long sides of the flat sheet) and then the maximum deformation rate is calculated in an environment at 20° C. Accordingly, a maximum deformation rate of the resin sealing portion is, for instance, 2.5% in a case where the maximum displacement of the resin sealing portion is 0.01 mm, upon application of a load onto a 10 mm-thick plate-like resin sealing portion (for instance, of epoxy resin). By contrast, the maximum deformation rate of the sheet-like second electrode is 25%. In this case, the maximum deformation rate of the resin sealing portion is smaller than the maximum deformation rate of the sheet-like second electrode. Therefore, the resin sealing portion has higher rigidity than the flexible electrode.

EXAMPLES

The present invention is explained more specifically below on the basis of examples, but the invention is not limited to the following examples.

Example 1

Firstly, a 10 cm×10 cm×4 mm FTO substrate was prepared. Next, a titanium oxide paste (Ti nanoixide T/sp, manufactured by Solaronix) was applied, using a doctor blade method, onto the FTO substrate, to a thickness of 10 μm. Thereafter, the whole was placed in a hot-air circulation oven, and was baked for 3 hours at 500° C., to form a porous oxide semiconductor layer on the FTO substrate and obtain a 5 cm×5 cm working electrode.

Next, the working electrode was immersed for one day and one night in an absolute ethanol solution in which N719 photosensitive dye was dissolved to a concentration of 0.2 mM to cause the photosensitive dye to be supported on the working electrode.

Meanwhile, a counter electrode substrate comprising FTO glass obtained by forming an FTO film, by SPD method, on a 6 cm×6 cm×2 mm borosilicate glass, was prepared in the same way as the working electrode. A 10 nm-thick platinum catalyst layer was formed then, by sputtering, on the counter electrode substrate, to obtain a counter electrode.

Thus, the working electrode and the counter electrode were prepared.

Next, there was prepared a square annular resin sheet having a 5 cm×5 cm×100 μm opening formed in the center of a 6 cm×6 cm×100 μm sheet comprising Himilan (manufactured by Du Pont-Mitsui Polychemicals, melting point: 98° C.) which is an ionomer. The resin sheet was disposed at a annular section surrounding a porous oxide semiconductor layer of the working electrode. The resin sheet was melted through heating for 5 minutes at 180° C., to be bonded thereby to the annular section and form a first sealing portion at a annular section on the FTO substrate.

Meanwhile, the same resin sheet as above was prepared on a platinum catalyst layer of the counter electrode. The resin sheet was disposed at a annular section on the platinum catalyst layer of the counter electrode. The resin sheet was melted through heating for 5 minutes at 180° C., to be bonded thereby to the annular section and form a second sealing portion at a annular section on the platinum catalyst layer of the counter electrode.

Next, the working electrode provided with the first sealing portion was disposed in such a manner that the surface of the FTO substrate, on the side of the porous oxide semiconductor layer, was leveled horizontally, and then a volatile electrolyte comprising 0.1 M of lithium iodide, 0.05 M of iodine, and 0.5 M of 4-tert-butylpyridine and using a volatile solvent comprising methoxyacetonitrile as a main solvent, was injected within the first sealing portion, to form an electrolyte layer.

Next, the counter electrode provided with the second sealing portion was disposed opposing the working electrode, and the first sealing portion and the second sealing portion were superposed under atmospheric pressure. A brass frame of the same size as the sealing portion was heated under atmospheric pressure. The brass frame was disposed on the opposite side of the second sealing portion on the counter electrode. A sealing portion was formed by melting through heating, at 148° C., the first sealing portion and the second sealing portion, while under application of 5 MPa of pressure using a press. A dye-sensitized solar cell was thus obtained.

Example 2

A dye-sensitized solar cell was manufactured in the same way as in Example 1, with the exception of changing the thermoplastic resin constituting the first sealing portion and the second sealing portion from Himilan, which is an ionomer, to Nucrel (manufactured by Du Pont-Mitsui Polychemicals; melting point: 98° C.) which is an ethylene-methacrylate copolymer.

Example 3

A dye-sensitized solar cell was manufactured in the same way as in Example 1, with the exception of changing the thermoplastic resin constituting the first sealing portion and the second sealing portion from Himilan, which is an ionomer, to Eval (manufactured by Kuraray; melting point: 165° C.) which is an ethylene-vinyl alcohol copolymer, and changing the temperature at which the sealing portion was formed through bonding of the first sealing portion and the second sealing portion (hereafter, "temperature during formation of the sealing portion") from 148° C. to 215° C.

Example 4

A dye-sensitized solar cell was manufactured in the same way as in Example 1, with the exception of changing the thermoplastic resin constituting the first sealing portion and the second sealing portion from Himilan, which is an ionomer, to Bynel (by Du Pont; melting point: 127° C.) which is an ethylene-vinyl acetic acid anhydride copolymer, and changing the temperature during formation of the sealing portion from 148° C. to 152° C.

Example 5

A dye-sensitized solar cell was manufactured in the same way as in Example 1, with the exception of changing the electrolyte from a volatile electrolyte to an ionic liquid. The ionic liquid used was a hexyl-methyl-imidazolium iodide salt.

Example 6

A dye-sensitized solar cell was manufactured in the same way as in Example 1, with the exception of changing the electrolyte to a gel electrolyte resulting from adding a gelling agent to the electrolyte of Example 1. The gelling agent used was silica microparticles having a particle size of 10 to 20 μm.

Example 7

A dye-sensitized solar cell was manufactured in the same way as in Example 1, with the exception of changing the temperature during formation of the sealing portion from 148° C. to 108° C.

Example 8

A dye-sensitized solar cell was manufactured in the same way as in Example 1, with the exception of changing the temperature during formation of the sealing portion from 148° C. to 118° C.

Example 9

A dye-sensitized solar cell was manufactured in the same way as in Example 1, with the exception of changing the temperature during formation of the sealing portion from 148° C. to 168° C.

Example 10

A dye-sensitized solar cell was manufactured in the same way as in Example 1, with the exception of changing the temperature during formation of the sealing portion from 148° C. to 198° C.

Example 11

A dye-sensitized solar cell was manufactured in the same way as in Example 1, with the exception of changing the temperature during formation of the sealing portion from 148° C. to 218° C.

Example 12

A dye-sensitized solar cell was manufactured in the same way as in Example 1, with the exception of changing the temperature during formation of the sealing portion from 148° C. to 228° C.

Example 13

A dye-sensitized solar cell was manufactured in the same way as in Example 1, with the exception of changing the temperature during formation of the sealing portion from 148° C. to 248° C.

Example 14

A dye-sensitized solar cell was manufactured in the same way as in Example 1, with the exception of changing the temperature during formation of the sealing portion from 148° C. to 298° C.

Example 15

A dye-sensitized solar cell was manufactured in the same way as in Example 1, with the exception of changing the temperature during formation of the sealing portion from 148° C. to 328° C.

Example 16

A dye-sensitized solar cell was manufactured in the same way as in Example 1 with the exception of changing the pressure at the time when the sealing portion was formed through bonding of the first sealing portion and the second sealing portion (hereafter, "pressure during formation of the sealing portion") from 5 MPa to 1 MPa.

Example 17

A dye-sensitized solar cell was manufactured in the same way as in Example 1, with the exception of changing the pressure during formation of the sealing portion from 5 MPa to 20 MPa.

Example 18

A dye-sensitized solar cell was manufactured in the same way as in Example 1, with the exception of changing the pressure during formation of the sealing portion from 5 MPa to 50 MPa.

Example 19

A working electrode was manufactured in the same way as in Example 1, and a photosensitive dye was supported on the working electrode in the same way as in Example 1. On the other hand, a counter electrode was manufactured in the same way as in Example 1.

Next, a first sealing portion was formed on the surface of the FTO substrate, on the side of the porous oxide semiconductor layer, in the same way as in Example 1, and a second sealing portion was formed on a platinum catalyst layer of the counter electrode, in the same way as in Example 1.

Next, the working electrode provided with the first sealing portion was placed in a stainless-steel reduced-pressure vessel having an opening. An electrolyte identical to that of Example 1 was injected within the first sealing portion, to form an electrolyte layer. Next, the counter electrode provided with the second sealing portion was placed in the reduced-pressure vessel. At this time, the first sealing portion and the second sealing portion were superposed on each other. The opening of the reduced-pressure vessel was then sealed with a flexible sheet comprising polyethylene terephthalate (PET), to form an airtight space in the reduced-pressure vessel. The airtight space was evacuated down to 800 Pa by means of a vacuum pump, to obtain a reduced-pressure space.

In the reduced-pressure space thus obtained, a sealing portion was formed by melting through heating, at 148° C., the first sealing portion and the second sealing portion while under application of 5 MPa of pressure using a press.

Next, the operation of the vacuum pump was then discontinued, and the flexible sheet was removed from the reduced-pressure vessel, to open the airtight space to the atmosphere. A dye-sensitized solar cell was thus obtained.

Example 20

A dye-sensitized solar cell was manufactured in the same way as in Example 19, but herein the temperature during formation of the sealing portion was changed from 148° C. to 108° C.

Example 21

A dye-sensitized solar cell was manufactured in the same way as in Example 19, with the exception of changing the temperature during formation of the sealing portion from 148° C. to 118° C.

Example 22

A dye-sensitized solar cell was manufactured in the same way as in Example 19, with the exception of changing the temperature during formation of the sealing portion from 148° C. to 218° C.

Example 23

A dye-sensitized solar cell was manufactured in the same way as in Example 19, with the exception of changing the temperature during formation of the sealing portion from 148° C. to 228° C.

Example 24

A dye-sensitized solar cell was manufactured in the same way as in Example 19 with the exception of changing the working electrode to a flexible electrode by changing the FTO glass in the working electrode to a platinized titanium foil. The platinized titanium foil was obtained by sputtering platinum onto the surface of a 40 μm-thick titanium foil.

Example 25

A dye-sensitized solar cell was manufactured in the same way as in Example 19, with the exception of changing the FTO glass in the counter electrode to a platinized titanium foil. The platinized titanium foil was obtained by sputtering platinum onto the surface of a 40 μm-thick titanium foil.

Example 26

A dye-sensitized solar cell was manufactured in the same way as in Example 19, with the exception of changing the FTO glass in the counter electrode to a platinized titanium foil, and changing the electrolyte from a volatile electrolyte to an ionic liquid. The ionic liquid used was the same as in Example 5. The platinized titanium foil was obtained by sputtering platinum onto the surface of a 40 μm-thick titanium foil.

Example 27

A dye-sensitized solar cell was manufactured in the same way as in Example 19, with the exception of changing the FTO glass in the counter electrode to a platinized titanium foil, and changing the electrolyte to a gel electrolyte obtained by adding a gelling agent to the electrolyte of Example 1. The gelling agent used was the same as in Example 6. The platinized titanium foil was obtained by sputtering platinum onto the surface of a 40 μm-thick titanium foil.

Comparative Example 1

A dye-sensitized solar cell was manufactured in the same way as in Example 1 with the exception of forming no second sealing portion on the counter electrode.

Comparative Example 2

A dye-sensitized solar cell was manufactured in the same way as in Example 2 with the exception of forming no second sealing portion on the counter electrode.

Comparative Example 3

A dye-sensitized solar cell was manufactured in the same way as in Example 3 with the exception of forming no second sealing portion on the counter electrode.

Comparative Example 4

A dye-sensitized solar cell was manufactured in the same way as in Example 4 with the exception of forming no second sealing portion on the counter electrode.

Comparative Example 5

A dye-sensitized solar cell was manufactured in the same way as in Example 5 with the exception of forming no second sealing portion on the counter electrode.

Comparative Example 6

A dye-sensitized solar cell was manufactured in the same way as in Example 6 with the exception of forming no second sealing portion on the counter electrode.

Comparative Example 7

A dye-sensitized solar cell was manufactured in the same way as in Example 1 with the exception of forming no first sealing portion on the working electrode.

Comparative Example 8

A dye-sensitized solar cell was manufactured in the same way as in Example 1 with the exception of heating the first sealing portion and the second sealing portion at a temperature of 88° C., lower by 10° C. than the melting point of thermoplastic resin during heating the first sealing portion and the second sealing portion.

[Observation Results of the Interface Between the First Sealing Portion and the Second Sealing Portion]

The dye-sensitized solar cells obtained in Examples 1 to 27 and Comparative example 8 were cut into chips containing 10 mm×10 mm×about 6 mm (thickness) sealing portion using a wet cutter 32F-300, manufactured by Heiwa Technica. At this time, the sealing portion was cut along the thickness direction of the dye-sensitized solar cell, to expose a cut surface of the sealing portion. Thereafter, the chips were polished, from the side of the working electrode, to a thickness no greater than 2 mm. The exposed cut surface of the sealing portion was then polished using a cross section polisher (manufactured by JEOL), and the polished surface was inspected by SEM. A layer between the first sealing portion and the second sealing portion in the cut surface was found in all the dye-sensitized solar cells of Examples 1 to 27. This layer was subjected to IR analysis (infrared spectroscopy), which showed peaks derived from oxidation in the first sealing portion and the second sealing portion. Accordingly, the layer observed between the first sealing portion and the second sealing portion is thought to be a mixed layer comprising mixture of thermoplastic resin included in the first sealing portion, an oxide of the thermoplastic resin, as well as the thermoplastic resin included in the second sealing portion, and an oxide of the thermoplastic resin.

By contrast, a cut surface of the dye-sensitized solar cell of Comparative example 8 was examined by SEM in the same way as in Example 1. But no peaks derived from oxidation of the first sealing portion and the second sealing portion were found at the section between the first sealing portion and the second sealing portion in the cut surface, i.e. no oxide coat was observed.

[Characteristic Evaluation]
(1) Initial Conversion Efficiency

The initial conversion efficiency ($\eta_0$) of the dye-sensitized solar cells obtained in Examples 1 to 27 and Comparative examples 1 to 8 was measured. The results are given in Tables 1 to 3. Tables 1 to 3 show relative values, with respect to 100, for the initial photoelectric conversion efficiency ($\eta_0$), obtained through measurement, of the dye-sensitized solar cells of Examples 1 to 27 and Comparative examples 1 to 8.

TABLE 1

| | First sealing portion | Second sealing portion | Thermoplastic resin | Temperature during sealing portion formation (° C.) | Electrolyte | Pressure during sealing portion formation (MPa) | Reduced pressure | Flexibility | $\eta_0$ | Durability test |
|---|---|---|---|---|---|---|---|---|---|---|
| Example 1 | Yes | Yes | Himilan | 148 | Volatile | 5 | No | No | 100 | B |
| Example 2 | Yes | Yes | Nucrel | 148 | Volatile | 5 | No | No | 101 | B |
| Example 3 | Yes | Yes | Eval | 215 | Volatile | 5 | No | No | 102 | B |
| Example 4 | Yes | Yes | Bynel | 152 | Volatile | 5 | No | No | 99 | B |

TABLE 1-continued

| | First sealing portion | Second sealing portion | Thermoplastic resin | Temperature during sealing portion formation (° C.) | Electrolyte | Pressure during sealing portion formation (MPa) | Reduced pressure | Flexibility | $\eta_0$ | Durability test |
|---|---|---|---|---|---|---|---|---|---|---|
| Example 5 | Yes | Yes | Himilan | 148 | Ionic liquid | 5 | No | No | 70 | A |
| Example 6 | Yes | Yes | Himilan | 148 | Gel electrolyte | 5 | No | No | 80 | A |
| Example 7 | Yes | Yes | Himilan | 108 | Volatile | 5 | No | No | 98 | C |
| Example 8 | Yes | Yes | Himilan | 118 | Volatile | 5 | No | No | 102 | B |
| Example 9 | Yes | Yes | Himilan | 168 | Volatile | 5 | No | No | 101 | B |
| Example 10 | Yes | Yes | Himilan | 198 | Volatile | 5 | No | No | 102 | B |
| Example 11 | Yes | Yes | Himilan | 218 | Volatile | 5 | No | No | 99 | B |
| Example 12 | Yes | Yes | Himilan | 228 | Volatile | 5 | No | No | 102 | C |
| Example 13 | Yes | Yes | Himilan | 248 | Volatile | 5 | No | No | 100 | C |
| Example 14 | Yes | Yes | Himilan | 298 | Volatile | 5 | No | No | 101 | C |

Table 2

| | First sealing portion | Second sealing portion | Thermoplastic resin | Temperature during sealing portion formation (° C.) | Electrolyte | Pressure during sealing portion formation (MPa) | Reduced pressure | Flexibility | $\eta_0$ | Durability test |
|---|---|---|---|---|---|---|---|---|---|---|
| Example 15 | Yes | Yes | Himilan | 328 | Volatile | 5 | No | No | 96 | C |
| Example 16 | Yes | Yes | Himilan | 148 | Volatile | 1 | No | No | 100 | C |
| Example 17 | Yes | Yes | Himilan | 148 | Volatile | 20 | No | No | 99 | B |
| Example 18 | Yes | Yes | Himilan | 148 | Volatile | 50 | No | No | 100 | C |
| Example 19 | Yes | Yes | Himilan | 148 | Volatile | 5 | Yes | No | 102 | A |
| Example 20 | Yes | Yes | Himilan | 108 | Volatile | 5 | Yes | No | 101 | B |
| Example 21 | Yes | Yes | Himilan | 118 | Volatile | 5 | Yes | No | 100 | A |
| Example 22 | Yes | Yes | Himilan | 218 | Volatile | 5 | Yes | No | 102 | A |
| Example 23 | Yes | Yes | Himilan | 228 | Volatile | 5 | Yes | No | 98 | B |
| Example 24 | Yes | Yes | Himilan | 148 | Volatile | 5 | No | Yes | 103 | A |
| Example 25 | Yes | Yes | Himilan | 148 | Volatile | 5 | Yes | Yes | 110 | A |
| Example 26 | Yes | Yes | Himilan | 148 | Ionic liquid | 5 | Yes | Yes | 76 | A |
| Example 27 | Yes | Yes | Himilan | 148 | Gel electrolyte | 5 | Yes | Yes | 86 | A |

TABLE 3

| | First sealing portion | Second sealing portion | Thermoplastic resin | Temperature during sealing portion formation (° C.) | Electrolyte | Pressure during sealing portion formation (MPa) | Reduced pressure | Flexibility | $\eta_0$ | Durability test |
|---|---|---|---|---|---|---|---|---|---|---|
| Comp. example 1 | Yes | No | Himilan | 148 | Volatile | 5 | No | No | 99 | D |
| Comp. example 2 | Yes | No | Nucrel | 148 | Volatile | 5 | No | No | 98 | D |
| Comp. example 3 | Yes | No | Eval | 148 | Volatile | 5 | No | No | 99 | D |
| Comp. example 4 | Yes | No | Bynel | 148 | Volatile | 5 | No | No | 98 | D |
| Comp. example 5 | Yes | No | Himilan | 148 | Ionic liquid | 5 | No | No | 68 | D |
| Comp. example 6 | Yes | No | Himilan | 148 | Gel electrolyte | 5 | No | No | 79 | D |
| Comp. example 7 | No | Yes | Himilan | 148 | Volatile | 5 | No | No | 97 | D |
| Comp. example 8 | Yes | Yes | Himilan | 88 | Volatile | 5 | No | No | 84 | D |

(2) Durability Test

The durability test assesses the durability, i.e. the rate of decrease over time of the photoelectric conversion efficiency of the dye-sensitized solar cells. The durability test was performed specifically as follows. Firstly, the dye-sensitized solar cells obtained in Examples 1 to 27 and Comparative examples 1 to 8 were left to stand, immediately after having been manufactured, in an environment at 85° C., 85 RH % for 1000 hours, and then the photoelectric conversion efficiency ($\eta$) was measured. The rate of decrease of the photoelectric conversion efficiency was calculated according to the following formula: rate of decrease of photoelectric conversion efficiency=100×($\eta_0-\eta$)$\eta_0$, on the basis of the measured photoelectric conversion efficiency ($\eta$) and the initial conversion efficiency ($\eta_0$) measured as described above. The results are given in Tables 1 to 3. In Tables 1 to 3, the rate of decrease of photoelectric conversion efficiency was notated as follows in accordance with its value.

Less than 10%: A
From 10% to less than 15%: B
From 15% to less than 20%: C
50% or less, by 500 h after: D The results in Tables 1 to 3 show that the dye-sensitized solar cells in Examples 1 to 18 were superior to the dye-sensitized solar cells of Comparative examples 1 to 8, in particular in terms of durability. Accordingly, it was found that the dye-sensitized solar cell manufacturing method of the present invention allows manufacturing dye-sensitized solar cells in which drops of photoelectric conversion efficiency over time can be sufficiently suppressed.

A comparison between Examples 1, 5, 6, 7, 8, 11 and 12 and Examples 19, 26, 27, 20 to 23 revealed that durability can be further enhanced by forming the sealing portion within a reduced-pressure space. A comparison between Example 19 and Examples 24 and 25 revealed that initial conversion efficiency is further enhanced by using a flexible working electrode or a flexible counter electrode.

Explanation of Reference Numerals 1, 101 ... working electrode (first electrode), 2, 102 ... counter electrode (second electrode), 3 ... electrolyte, 4A ... first sealing portion, 4B ... second sealing portion, 4 ... sealing portion, 13A, 13B ... protrusion, 100, 200 ... dye-sensitized solar cell, C1 ... first annular section, C2 ... second annular section, S ... cell space

The invention claimed is:

1. A dye-sensitized solar cell manufacturing method, comprising:
 a preparation step of preparing a first electrode having a porous oxide semiconductor layer, and a second electrode;
 a first sealing portion formation step of forming a first sealing portion by melting and bonding a thermoplastic resin at a first annular section, of the first electrode, that surrounds the porous oxide semiconductor layer;
 a second sealing portion formation step of forming a second sealing portion by melting and bonding a thermoplastic resin at a second annular section of the second electrode;
 a dye support step of causing a photosensitive dye to be supported on the porous oxide semiconductor layer;
 an electrolyte layer formation step of forming an electrolyte layer by arranging an electrolyte on the first electrode, within the first sealing portion, or on the second electrode, within the second sealing portion; and
 a sealing portion bonding step of forming a sealing portion through bonding of the first sealing portion and the second sealing portion,
 wherein the electrolyte layer formation step is carried out after at least one of the first sealing portion formation step and the second sealing portion formation step;
 the sealing portion bonding step is carried out after the dye support step and the electrolyte layer formation step; and
 in the sealing portion bonding step, the sealing portion is formed through melting, while under application of pressure, of the first sealing portion and the second sealing portion.

2. The dye-sensitized solar cell manufacturing method according to claim 1, wherein the sealing portion bonding step is carried out in a reduced-pressure space.

3. The dye-sensitized solar cell manufacturing method according to claim 2, wherein at least one of the first electrode and the second electrode has flexibility.

4. The dye-sensitized solar cell manufacturing method according to claim 1, wherein in the electrolyte layer formation step, the electrolyte layer is formed by infusing the electrolyte onto the first electrode, within the first sealing portion, or onto the second electrode, within the second sealing portion, and causing the electrolyte to overflow beyond the first sealing portion or the second sealing portion to the outside of the first sealing portion or the second sealing portion.

5. The dye-sensitized solar cell manufacturing method according to claim 1, wherein in the electrolyte layer formation step, the electrolyte layer is formed on the first electrode, within the first sealing portion.

6. The dye-sensitized solar cell manufacturing method according to claim 1, wherein
 the first electrode has:
 the porous oxide semiconductor layer;
 a conductive film on which the porous oxide semiconductor layer is formed; and
 a protrusion that is provided so as to protrude on the conductive film and that constitutes the first annular section, and wherein
 the protrusion is formed of an inorganic material.

7. The dye-sensitized solar cell manufacturing method according to claim 1, wherein
 the second electrode has:
 a counter electrode substrate;
 a catalyst layer provided on the counter electrode substrate; and
 a protrusion that is provided so as to protrude on the catalyst layer and that constitutes the second annular section, and wherein
 the protrusion is formed of an inorganic material.

8. The dye-sensitized solar cell manufacturing method according to claim 1, wherein both the first sealing portion and the second sealing portion comprise at least one selected from the group consisting of acid-modified polyethylene, polyvinyl alcohol and an ethylene-vinyl alcohol copolymer.

9. The dye-sensitized solar cell manufacturing method according to claim 1, wherein both the first sealing portion and the second sealing portion comprise acid-modified polyethylene.

* * * * *